(12) United States Patent
Chou et al.

(10) Patent No.: US 11,131,833 B2
(45) Date of Patent: Sep. 28, 2021

(54) LENS MODULE AND ELECTRONIC DEVICE

(71) Applicant: LARGAN PRECISION CO., LTD., Taichung (TW)

(72) Inventors: Ming-Ta Chou, Taichung (TW); Cheng-Feng Lin, Taichung (TW); Wei-Hung Weng, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 153 days.

(21) Appl. No.: 15/951,103

(22) Filed: Apr. 11, 2018

(65) Prior Publication Data

US 2019/0278058 A1 Sep. 12, 2019

(30) Foreign Application Priority Data

Mar. 7, 2018 (TW) ................................. 107107653

(51) Int. Cl.
*G02B 13/00* (2006.01)
*G02B 3/04* (2006.01)
(Continued)

(52) U.S. Cl.
CPC ............. *G02B 13/002* (2013.01); *G02B 3/04* (2013.01); *G02B 7/026* (2013.01); *G02B 27/0018* (2013.01); *G02B 27/0025* (2013.01)

(58) Field of Classification Search
CPC .. B29D 11/00; G02B 13/002; G02B 13/0045; G02B 27/0018; G02B 27/0025; G02B 3/04; G02B 7/021; G02B 7/026
See application file for complete search history.

(56) References Cited

U.S. PATENT DOCUMENTS 7,626,773 B2 * 12/2009 Noda ................... G02B 7/022
359/704
9,798,048 B2 10/2017 Chou
(Continued)

FOREIGN PATENT DOCUMENTS

CN 202025099 U 11/2011
CN 203786314 U 8/2014
(Continued)

OTHER PUBLICATIONS

CN Office Action in Application No. 201810193169.1 dated Dec. 3, 2020.

*Primary Examiner* — Joseph P Martinez
*Assistant Examiner* — Vipin Patel
(74) *Attorney, Agent, or Firm* — Maschoff Brennan

(57) ABSTRACT

An annular optical component includes an inner surface, an outer surface, an object-side surface and an image-side surface. The inner surface includes multiple L-shaped annular grooves. The annular optical component includes multiple stripe-shaped structures disposed in the L-shaped annular grooves. The L-shaped annular grooves include an object-side L-shaped annular groove closest to the object-side surface and an image-side L-shaped annular groove closest to the image-side surface. A bottom diameter of the image-side L-shaped annular groove is larger than a bottom diameter of the object-side L-shaped annular groove. Each L-shaped annular groove includes a first side and a second side located between the object-side surface and the image-side surface. The stripe-shaped structures are disposed on the first side or the second side, and a degree of inclination between the first side and the central axis is larger than a degree of inclination between the second side and the central axis.

24 Claims, 22 Drawing Sheets

(51) Int. Cl.
    *G02B 7/02*           (2021.01)
    *G02B 27/00*        (2006.01)

(56) References Cited

U.S. PATENT DOCUMENTS

| | | |
|---|---|---|
| 9,864,160 B2 | 1/2018 | Lin et al. |
| 9,904,050 B2 | 2/2018 | Lin et al. |
| 2015/0253569 A1 | 9/2015 | Lin |
| 2017/0131513 A1* | 5/2017 | Lin .................. G02B 7/021 |
| 2018/0003916 A1* | 1/2018 | Lin .................. G02B 7/021 |
| 2018/0003959 A1* | 1/2018 | Lin .................. G02B 13/004 |

FOREIGN PATENT DOCUMENTS

| | | | |
|---|---|---|---|
| CN | 205139406 U | | 4/2016 |
| CN | 205899059 U | | 1/2017 |
| CN | 205899116 U | | 1/2017 |
| TW | M512712 U | | 11/2015 |
| TW | M519751 | * | 1/2016 |
| TW | M531602 | * | 1/2016 |
| TW | M517334 U | | 2/2016 |
| TW | M529856 U | | 10/2016 |
| TW | M531602 U | | 11/2016 |

\* cited by examiner

LENS MODULE AND ELECTRONIC DEVICE

RELATED APPLICATIONS

This application claims priority to Taiwan Application 107107653, filed on Mar. 7, 2018, which is incorporated by reference herein in its entirety.

BACKGROUND

Technical Field

The present disclosure relates to an annular optical component, a lens module and an electronic device, more particularly to an annular optical component and a lens module applicable to an electronic device.

Description of Related Art

With the development of semiconductor manufacturing technology, the performance of image sensors has been improved, and the pixel size thereof has been scaled down. Therefore, featuring high image quality has been one of the indispensable features of an optical system nowadays.

However, a conventional optical system does not have a proper capability of eliminating stray light. Thus, when powerful light rays are existed in the environment where an imaged object is located, unwanted light traveling into the optical system will be received by an image sensor, thereby resulting in halo effect at the periphery of the image. Specifically, the above-mentioned problems usually happen when the image object is located outdoors with sufficient amount of sunlight, or the image object is located in a dim room where a high intensity light source is existed.

SUMMARY

According to one aspect of the present disclosure, an annular optical component includes an inner surface, an outer surface, an object-side surface and an image-side surface. The inner surface surrounds a central axis of the annular optical component, and the inner surface defines a central aperture. The outer surface is opposite to the inner surface. The object-side surface faces toward an object side of the annular optical component. The object-side surface is connected to the inner surface and the outer surface. The image-side surface faces toward an image side of the annular optical component. The image-side surface is connected to the inner surface and the outer surface, and the image-side surface is opposite to the object-side surface. The inner surface includes a plurality of L-shaped annular grooves. The annular optical component includes a plurality of stripe-shaped structures disposed in the L-shaped annular grooves, and the stripe-shaped structures are arranged along a circumferential direction of the annular optical component. The L-shaped annular grooves include an object-side L-shaped annular groove closest to the object-side surface and an image-side L-shaped annular groove closest to the image-side surface. A bottom diameter of the image-side L-shaped annular groove is larger than a bottom diameter of the object-side L-shaped annular groove. Each of the L-shaped annular grooves includes a first side and a second side connected to each other. The first side and the second side are located between the object-side surface and the image-side surface. The stripe-shaped structures are disposed on either the first side or the second side, and a degree of inclination between the first side and the central axis is larger than a degree of inclination between the second side and the central axis.

According to another aspect of the present disclosure, an annular optical component includes an inner surface, an outer surface, an object-side surface and an image-side surface. The inner surface surrounds a central axis of the annular optical component, and the inner surface defines a central aperture. The outer surface is opposite to the inner surface. The object-side surface faces toward an object side of the annular optical component. The object-side surface is connected to the inner surface and the outer surface. The image-side surface faces toward an image side of the annular optical component. The image-side surface is connected to the inner surface and the outer surface, and the image-side surface is opposite to the object-side surface. The inner surface includes at least one L-shaped annular groove. The annular optical component includes a plurality of stripe and wedge-shaped structures disposed in the L-shaped annular groove. The stripe and wedge-shaped structures are arranged along a circumferential direction of the annular optical component, and each of the stripe and wedge-shaped structures includes a tapered portion. The L-shaped annular groove includes a first side and a second side connected to each other. The first side and the second side are located between the object-side surface and the image-side surface. The stripe and wedge-shaped structures are disposed on the second side, and a degree of inclination between the first side and the central axis is larger than a degree of inclination between the second side and the central axis. The degree of inclination between the second side and the central axis is $\alpha$, and the following condition is satisfied:

$$0 \text{ degrees} \leq \alpha \leq 15 \text{ degrees}.$$

According to still another aspect of the present disclosure, a lens module includes one of the aforementioned annular optical component and an optical lens assembly. The annular optical component is disposed on the optical lens assembly.

According to yet another aspect of the present disclosure, an electronic device includes the aforementioned lens module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
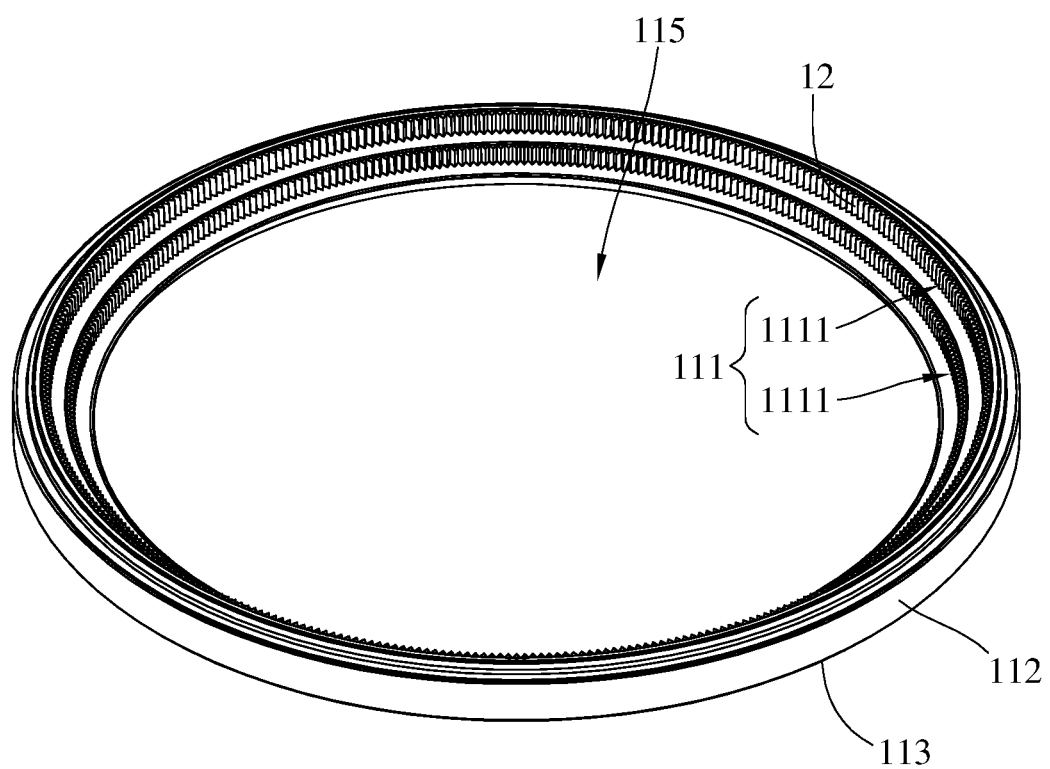
FIG. 1 is a perspective view of an annular optical component according to the 1st embodiment of the present disclosure.

An annular optical component includes an inner surface, an outer surface, an object-side surface and an image-side surface. The inner surface surrounds a central axis of the annular optical component, and the inner surface defines a central aperture. The outer surface is opposite to the inner surface. The object-side surface faces toward an object side of the annular optical component, and the object-side surface is connected to the outer surface and the inner surface. The image-side surface faces toward an image side of the annular optical component, and the image-side surface is connected to the outer surface and the inner surface. The image-side surface is opposite to the object-side surface. The inner surface includes at least one L-shaped annular groove, and the annular optical component includes a plurality of stripe-shaped structures disposed in the L-shaped annular groove. The stripe-shaped structures are arranged along a circumferential direction of the annular optical component. The L-shaped annular groove includes a first side and a second side connected to each other. The first side and the second side are located between the object-side surface and the image-side surface. The stripe-shaped structures are disposed on either the first side or the second side. A degree of inclination between the first side and the central axis is larger than a degree of inclination between the second side and the central axis. The design of the L-shaped annular groove provides a space for accommodating the stripe-shaped structures which are arranged along the circumferential direction of the annular optical component. The stripe-shaped structures improve the structural strength of the annular optical component, and a light trapping structure is formed between every pair of two adjacent stripe-shaped structures. Therefore, the light trapping structures are favorable for capturing unwanted light rays so as to prevent an image from receiving stray light, thereby improving image quality. Furthermore, for the manufacture of annular optical component, the configuration of the annular optical component is favorable for modifying both the size and the shape of stripe-shaped structure so as to improve design flexibility, and thus the camera is applicable for various requirements.

The inner surface can include multiple L-shaped annular grooves, and the stripe-shaped structures are disposed on each of the L-shaped annular grooves. When the inner surface includes multiple L-shaped annular grooves, these L-shaped annular grooves includes an object-side L-shaped annular groove closest to the object-side surface and an image-side L-shaped annular groove closest to the image-side surface, and a bottom diameter of the image-side L-shaped annular groove is larger than a bottom diameter of the object-side L-shaped annular groove. Therefore, it is favorable for improving light trapping efficiency of the stripe-shaped structures.

The annular optical component can include a main body and the stripe-shaped structures mentioned above. The main body includes the inner surface, the outer surface, the object-side surface and the image-side surface. The main body can be integral with the stripe-shaped structures. Therefore, it is favorable for manufacturing the annular optical component by injection molding so as to reduce manufacturing cost.

When an angle between the first side and the second side of each L-shaped annular groove is θ, the following condition can be satisfied: 46 degrees <θ<136 degrees. Therefore, it is favorable for enhancing the design flexibility of a mold for manufacturing the annular optical component as well as maintaining a recognizable L-shaped annular groove. Preferably, the following condition can also be satisfied: 64 degrees <θ<116 degrees.

When the inner surface includes multiple L-shaped annular grooves, the L-shaped annular grooves can be not overlapped (non-overlapped) with each other in a direction parallel to the central axis. Therefore, it is favorable for controlling the lift off of the annular optical component, which is manufactured by injection molding, so as to prevent unfavorable mold release problems.

When a thickness of the annular optical component is t, and a length of each of the stripe-shaped structures is d, the following condition can be satisfied: 0.05<d/t<0.50. Therefore, during the manufacture of annular optical component, it is favorable for preventing shape distortion due to overly long stripe-shaped structure.

The number of the L-shaped annular groove can be two; that is, the inner surface includes only the object-side L-shaped annular groove closest to the object-side surface and the image-side L-shaped annular groove closest to the image-side surface. When a length of each of the stripe-shaped structures disposed in the object-side L-shaped annular groove is d1, and a length of each of the stripe-shaped structures disposed in the image-side L-shaped annular groove is d2, the following condition can be satisfied: 0.40<d1/d2<2.5. Therefore, it is favorable for the annular optical component including proper number of L-shaped annular groove so as to reduce manufacturing time of the annular optical component, thereby improving manufacturing efficiency.

When a width of the first side of the L-shaped annular groove is L1, and a width of the second side of the L-shaped annular groove is L2, the following condition can be satisfied: $0.45<L1/L2<2.5$. Therefore, the configuration of the L-shaped annular groove is favorable for providing a better capability of capturing unwanted light rays; thus, when reflected by the stripe-shaped structures, the unwanted light rays is prevented from escaping from the L-shaped annular groove. Preferably, the following condition can also be satisfied: $0.45<L1/L2<2.0$.

When the degree of inclination between the second side and the central axis of the annular optical component is α, the following condition can be satisfied: $0 \text{ degree} \leq \alpha \leq 15$ degrees. Therefore, it is favorable for enhancing lift off yield when molding the annular optical component as well as maintaining the light receiving range of L-shaped annular groove. Preferably, the following condition can also be satisfied: $0 \text{ degree} \leq \alpha \leq 8.0$ degrees.

According to the present disclosure, each of the stripe-shaped structures of the annular optical component can be a stripe and wedge-shaped structure. Therefore, it is favorable for obtaining an easier molding process and enhancing molding yield.

According to the present disclosure, each of the stripe and wedge-shaped structures can include a tapered portion. Therefore, it is favorable for forming a light trapping structure with a fine arrangement of the stripe and wedge-shaped structures.

According to the present disclosure, each of the tapered portions can include a smooth surface. Therefore, it is favorable for forming the light trapping structure without surface roughening treatment so as to simplify manufacturing processes.

According to the present disclosure, the stripe-shaped structures can have even height. When a height of each of the stripe-shaped structures is h, the following condition can be satisfied: $0.015 \text{ mm} < h < 0.23 \text{ mm}$. Therefore, a proper height of the stripe-shaped structure is favorable for forming ideal light trapping structure so as to improve the capability of blocking unwanted light rays. Preferably, the following condition can also be satisfied: $0.02 \text{ mm} < h < 0.12 \text{ mm}$.

According to the present disclosure, a cross section of the inner surface of the annular optical component is zigzag form. Therefore, it is favorable for forming a two dimensional and complicated light trapping structure so as to meet the requirements of night photography and dark room photography, thereby improving image quality.

When the inner surface includes more than two L-shaped annular grooves, the bottom diameter of the object-side L-shaped annular groove, which is closest to the object-side surface of the annular optical component, is $\varphi 1$, the bottom diameter of the image-side L-shaped annular groove, which is closest to the image-side surface of the annular optical component, is $\varphi 2$, a diameter of the outer surface is $\varphi o$, and a diameter of the inner surface is $\varphi i$, the following condition can be satisfied: $0.05<(\varphi 2-\varphi 1)/(\varphi o-\varphi i)<0.55$. When the inner surface includes single L-shaped annular groove, the bottom diameter of the L-shaped annular groove is $\varphi g$, the diameter of the outer surface is $\varphi o$, and the diameter of the inner surface is $\varphi i$, the following condition can be satisfied: $0.5<(\varphi o-\varphi g)/(\varphi g-\varphi i)<10$. Therefore, it is favorable for properly arranging the positions of the L-shaped annular grooves so as to reduce flaws in the appearance of annular optical component caused by bending and shrinkage during the injection molding, thereby improving manufacturing quality.

According to the present disclosure, a lens module includes the aforementioned annular optical component and an optical lens assembly. The annular optical component is disposed in the optical lens assembly. In some embodiments, the lens module can further include a barrel member, a holding member or a combination thereof.

According to the present disclosure, the annular optical component can include an axial assembling structure, and the annular optical component can be disposed in the optical lens assembly by the axial assembling structure. The optical lens assembly includes a lens element adjacent to the annular optical component, and the axial assembling structure is configured to align the central axis of the annular optical component with a center of the lens element. Therefore, it is favorable for improving the coaxiality of the lens elements of the optical lens assembly so as to compensate unavoidable tolerances in the assembling process.

According to the present disclosure, the annular optical component can be a fixing ring configured to configured to determine the axial distances between every two of lens elements of the optical lens assembly that are adjacent to each other. The central aperture of the annular optical component is configured to allow light to pass through the lens module, and only one of the object-side surface and the image-side surface contacts the optical lens assembly. Therefore, it is favorable for preventing the axial distances between every pair of two adjacent lens elements from unpredictable changes due to the influence of outside environment so as to improve the reliability of optical performance.

According to the present disclosure, the L-shaped annular groove basically includes the first side and the second side which jointly consist the L-shaped profile. The connection of the first side and the second side can enclose with an acute angle or an obtuse angle; alternatively, the connection of the first side and the second side can be a corner with radius or other geometric shapes.

According to the present disclosure, the tapered portion of the stripe and wedge-shaped structure can be substantially in a shape of isosceles triangle, and a tip of the tapered portion is formed by the intersection of two lateral sides.

According to the present disclosure, an opening of the L-shaped annular groove is toward either the image-side surface, the central aperture, or a direction between the image-side surface and the central aperture.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
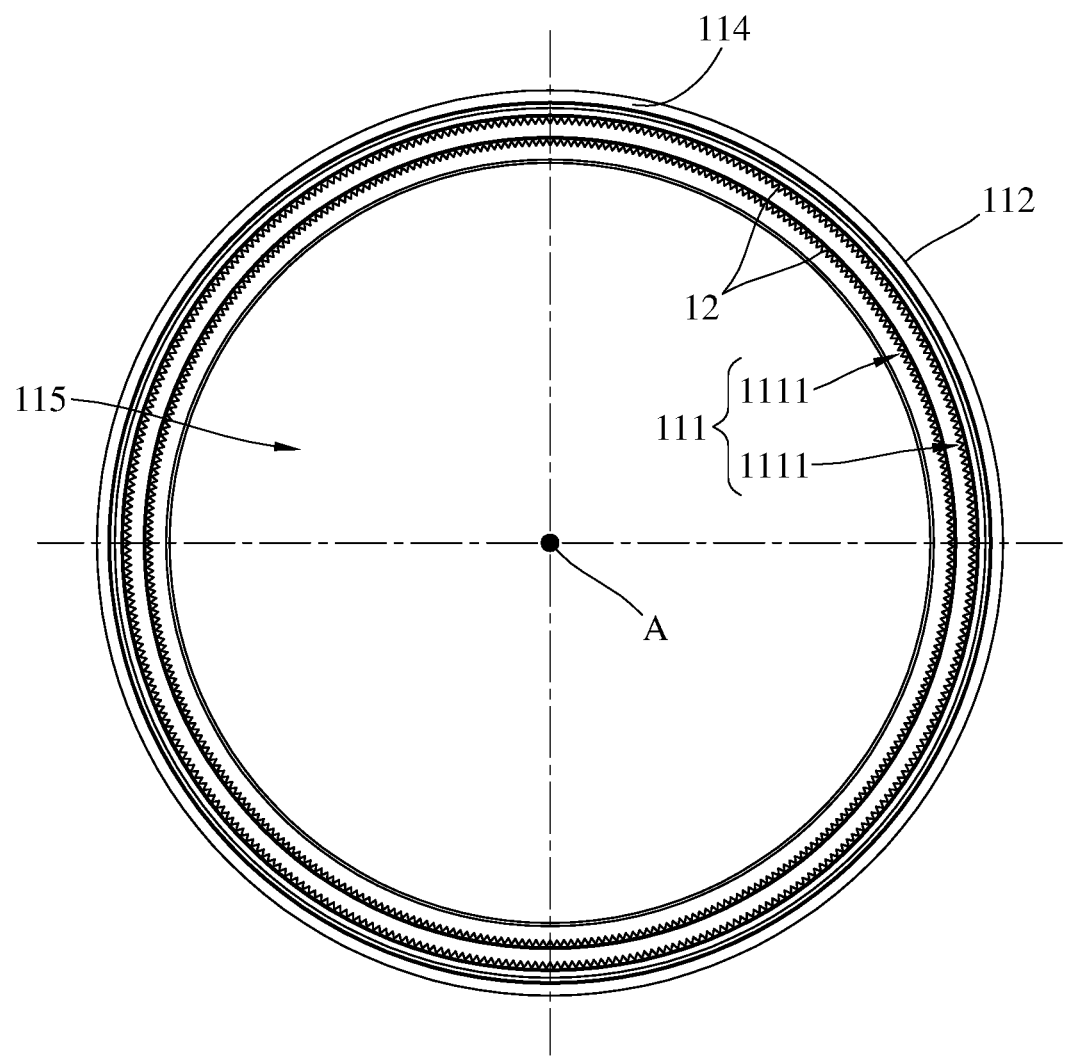
FIG. 2 is a top view of the annular optical component in FIG. 1.
Figure 3:
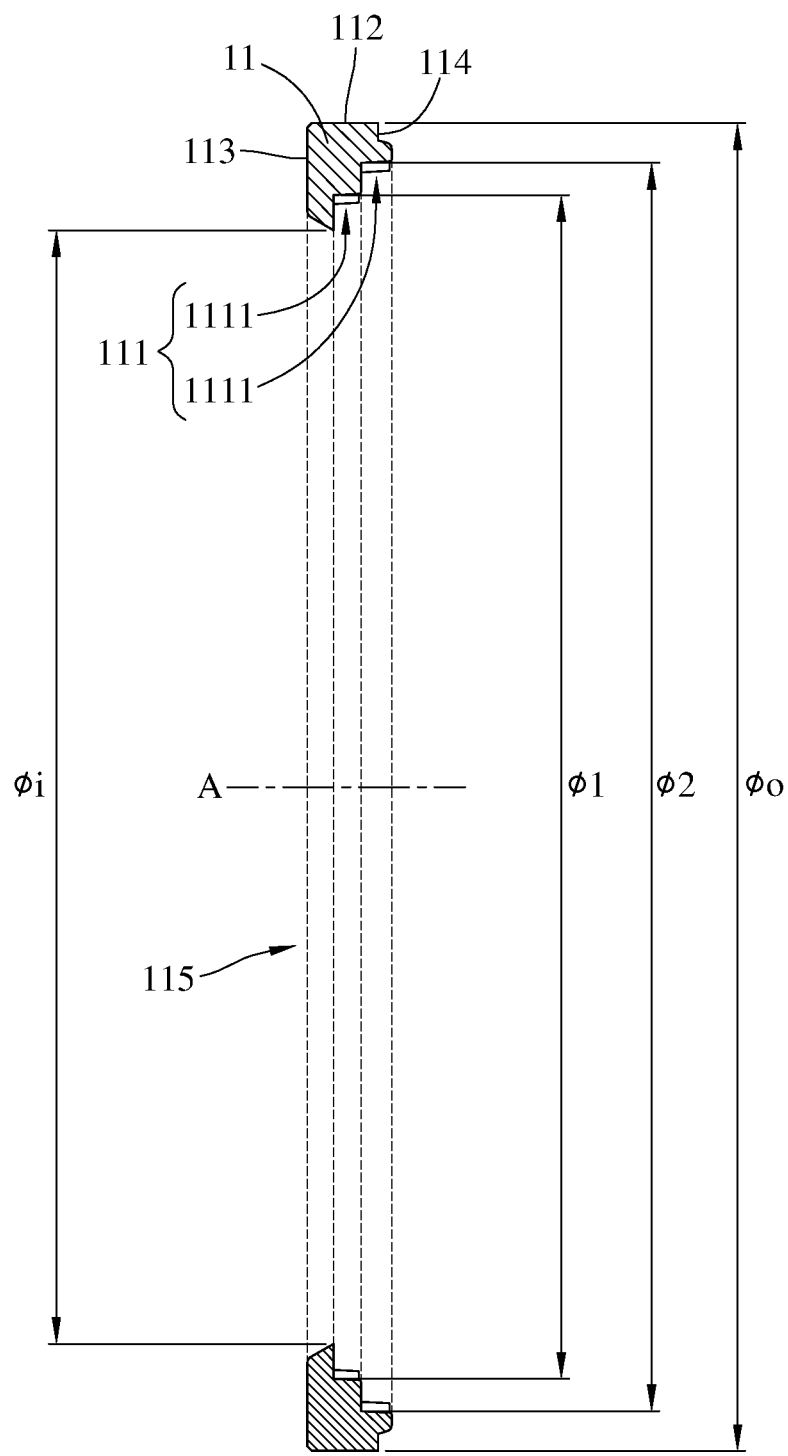
FIG. 3 is a side cross-sectional view of the annular optical component in FIG. 1.

FIG. 1 is a perspective view of an annular optical component according to the 1st embodiment of the present disclosure. FIG. 2 is a top view of the annular optical component in FIG. 1. FIG. 3 is a side cross-sectional view of the annular optical component in FIG. 1. In this embodiment, an annular optical component includes a main body 11 and a plurality of stripe-shaped structures 12 which are integral with each other.

The main body 11 includes an inner surface 111, an outer surface 112, an object-side surface 113 and an image-side surface 114. The inner surface 111 surrounds a central axis A of the annular optical component and defines a central aperture 115. The outer surface 112 is opposite to the inner surface 111. The object-side surface 113 faces toward an object side of the annular optical component and is connected to the outer surface 112 and the inner surface 111. The image-side surface 114 faces toward an image side of the annular optical component and is connected to the outer surface 112 and the inner surface 111. The image-side surface 114 is opposite to the object-side surface 113. As shown in FIG. 3, a cross section of the inner surface 111 of the annular optical component in side view is zigzag form.

Figure 4:
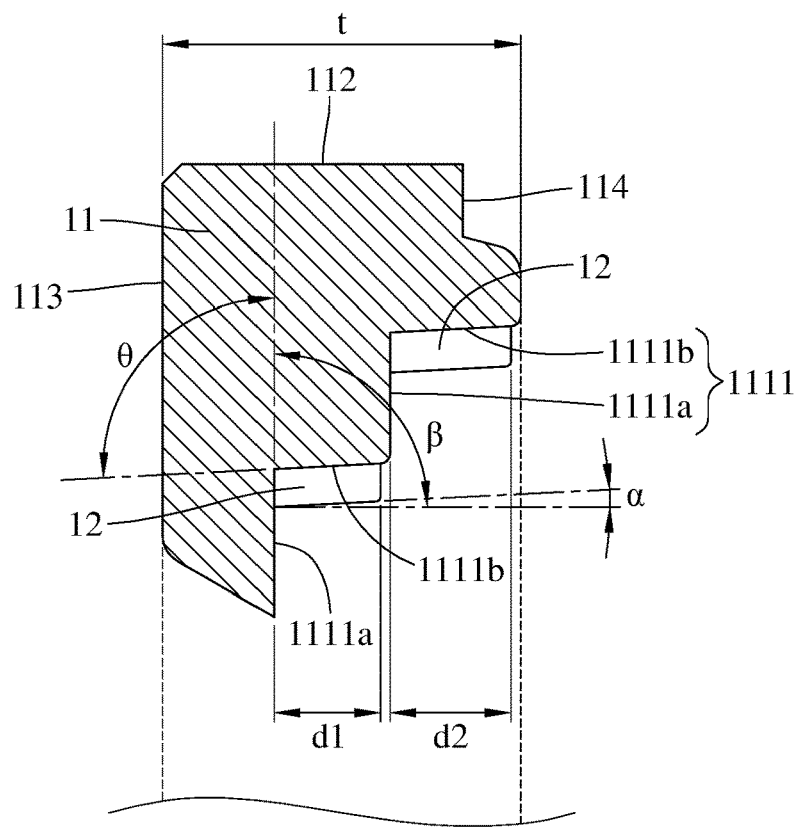
FIG. 4 and FIG. 5 are enlarged views of the annular optical component in FIG. 3.
Figure 5:
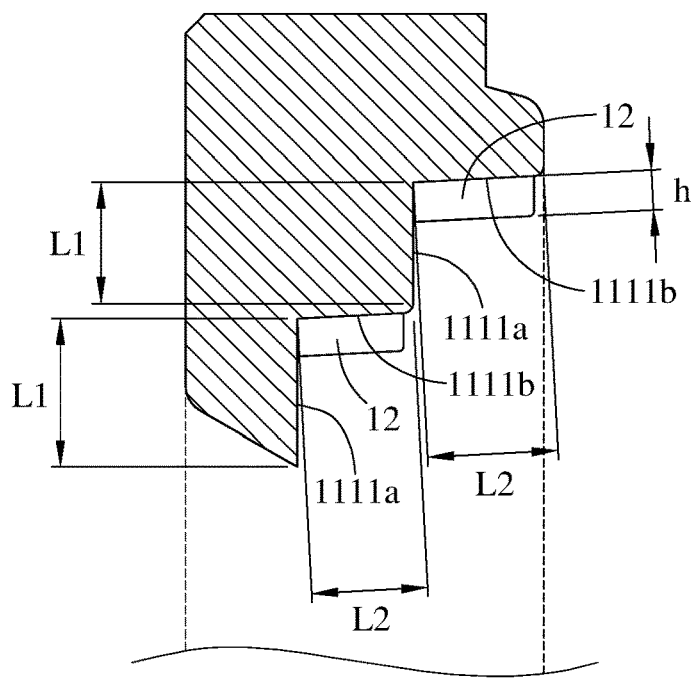
Figure 6:
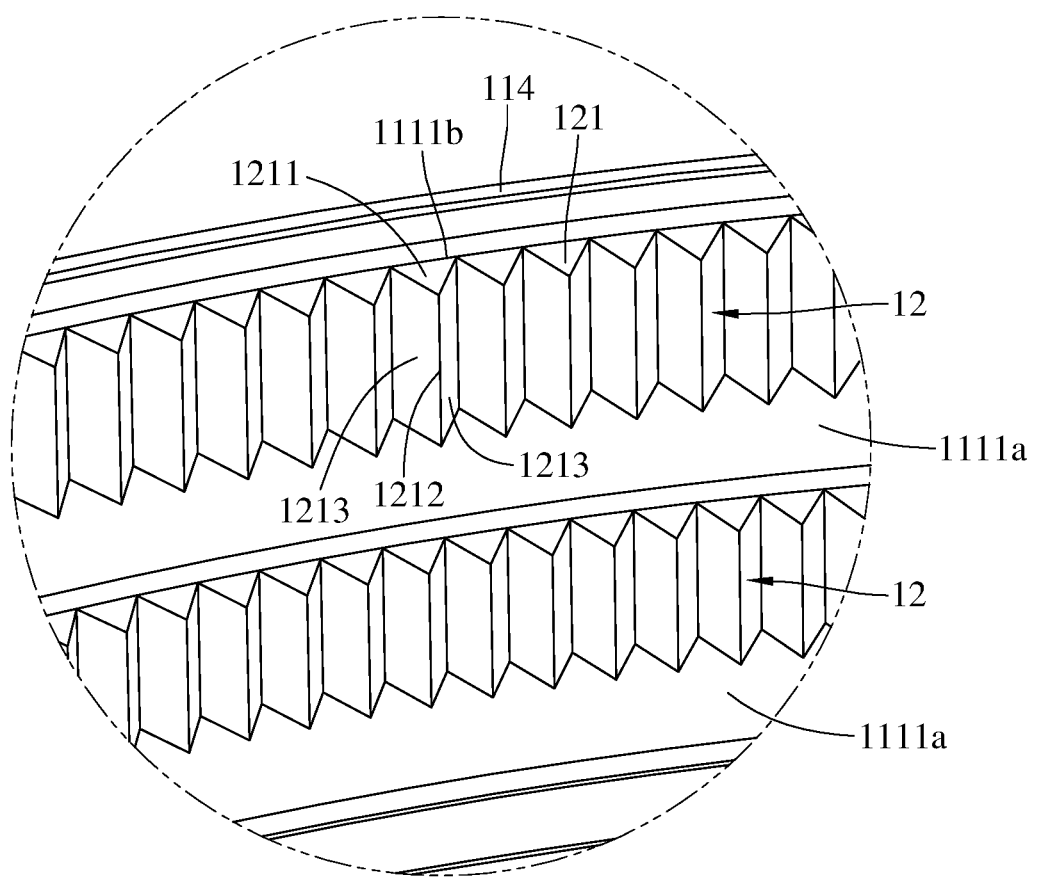
FIG. 6 is an enlarged views of the annular optical component in FIG. 1.

FIG. 4 and FIG. 5 are enlarged views of the annular optical component in FIG. 3. FIG. 6 is an enlarged views of the annular optical component in FIG. 1. The inner surface 111 includes two L-shaped annular grooves 1111. One of the two L-shaped annular grooves 1111 closer to the object-side surface 113 is interpreted as an object-side L-shaped annular groove, and the other L-shaped annular groove 1111 closer to the image-side surface 114 is interpreted as an image-side L-shaped annular groove. The two L-shaped annular grooves 1111 are not overlapped with each other in a direction parallel to the central axis A. The stripe-shaped structures 12 are disposed in the L-shaped annular grooves 1111, and the stripe-shaped structures 12 in each L-shaped annular groove 1111 are arranged along a circumferential direction of the annular optical component. In detail, each L-shaped annular groove 1111 includes a first side 1111a and a second side 1111b which are located between the object-side surface 113 and the image-side surface 114. The first side 1111a and the second side 1111b are connected to each other, and the stripe-shaped structures 12 are disposed on the second side 1111b. As shown in FIG. 6, an end of each stripe-shaped structure 12 contacts the first side 1111a of the L-shaped annular groove 1111, and the other end of each stripe-shaped structure 12 faces toward the image side of the annular optical component.

Each of the stripe-shaped structures 12 is a stripe and wedge-shaped structure including a tapered portion 121. The tapered portion 121 includes a smooth surface. In detail, the size of the tapered portion 121 is gradually decreased from a bottom 1211 closing the second side 1111b to a tip 1212 away from the second side 1111b, and the tapered portion 121 includes two inclined surfaces 1213 which are smooth.

A bottom diameter φ2 of the image-side L-shaped annular groove (the L-shaped annular groove 1111 closer to the image-side surface 114) is larger than a bottom diameter φ1 of the object-side L-shaped annular groove (the L-shaped annular groove 1111 closer to the object-side surface 113). A degree of inclination β between the first side 1111a and the central axis A of the annular optical component is larger than a degree of inclination α between the second side 1111b and the central axis A. FIG. 4 shows the angle α (degree of inclination) between a reference line parallel to the second side 1111b and the other reference line parallel to the central axis A.

When an angle between the first side 1111a and the second side 1111b of each of the L-shaped annular grooves 1111 is θ, the following condition is satisfied: θ=93 degrees (deg.).

When a thickness of the annular optical component is t, and a length of each of the stripe-shaped structures 12 disposed in the object-side L-shaped annular groove is d1, the following condition is satisfied: d1/t=0.30.

When the thickness of the annular optical component is t, and a length of each of the stripe-shaped structures 12 disposed in the image-side L-shaped annular groove is d2, the following condition is satisfied: d2/t=0.35.

When the length of each of the stripe-shaped structures 12 disposed in the object-side L-shaped annular groove is d1, and the length of each of the stripe-shaped structures 12 disposed in the image-side L-shaped annular groove is d2, the following condition is satisfied: d1/d2=0.85.

When a width of the first side 1111a of the object-side L-shaped annular groove is L1, and a width of the second side 1111b of the object-side L-shaped annular groove is L2, the following condition is satisfied: L1/L2=1.36.

When a width of the first side 1111a of the image-side L-shaped annular groove is L1, and a width of the second side 1111b of the image-side L-shaped annular groove is L2, the following condition is satisfied: L1/L2=1.0.

When the degree of inclination between the second side 1111b and the central axis A of the annular optical component is α, the following condition is satisfied: α=2.955 degrees.

The stripe-shaped structures 12 have even height. When a height of each of the stripe-shaped structures 12 is h, the following condition is satisfied: h=0.04 millimeter (mm).

When the bottom diameter of the object-side L-shaped annular groove is φ1, the bottom diameter of the image-side L-shaped annular groove is φ2, a diameter of the outer surface 112 is φo, and a diameter of the inner surface 111 is φi, the following condition is satisfied: (φ2−φ1)/(φo−φi) =0.30.

2nd Embodiment

Figure 7:
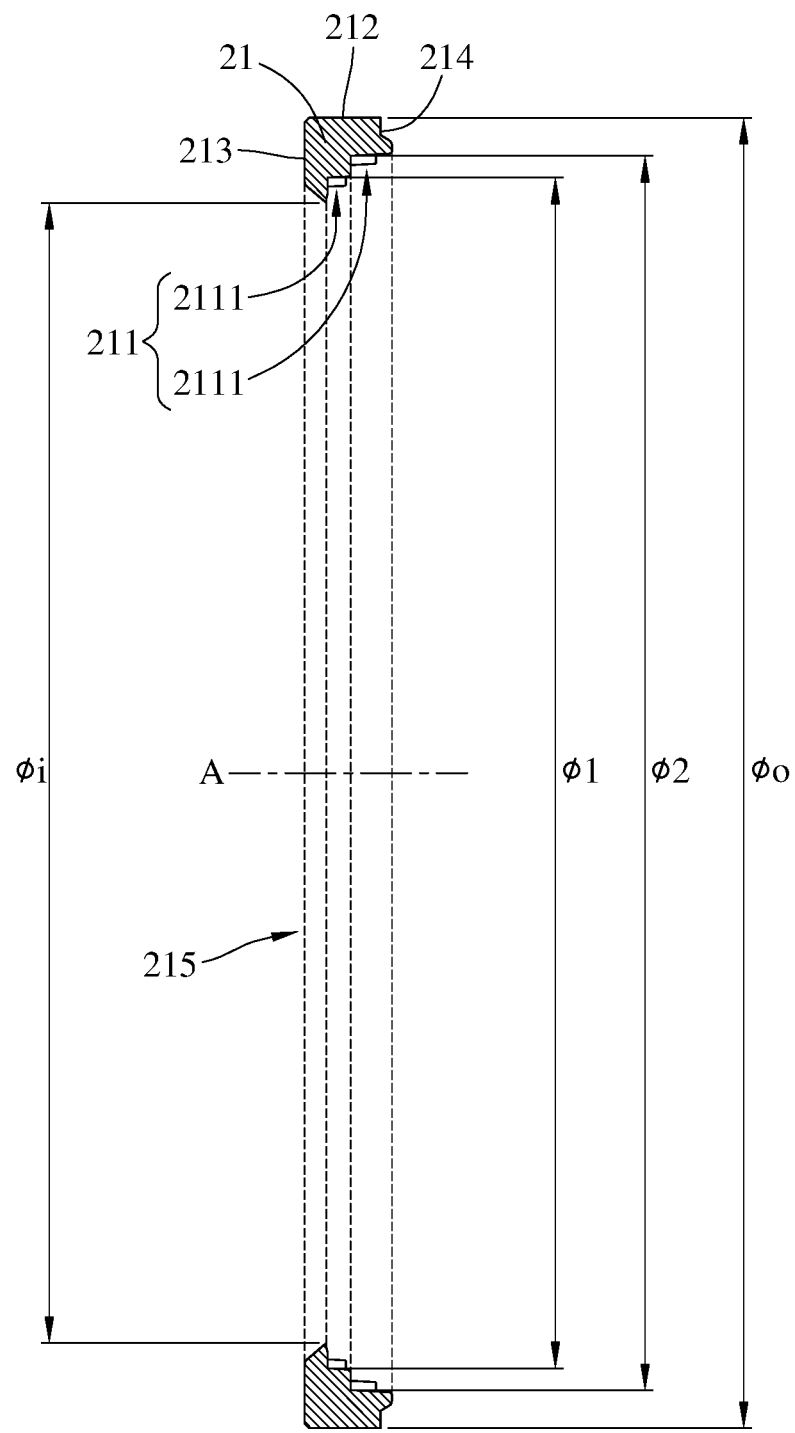
FIG. 7 is a side cross-sectional view of an annular optical component according to the 2nd embodiment of the present disclosure.
Figure 8:
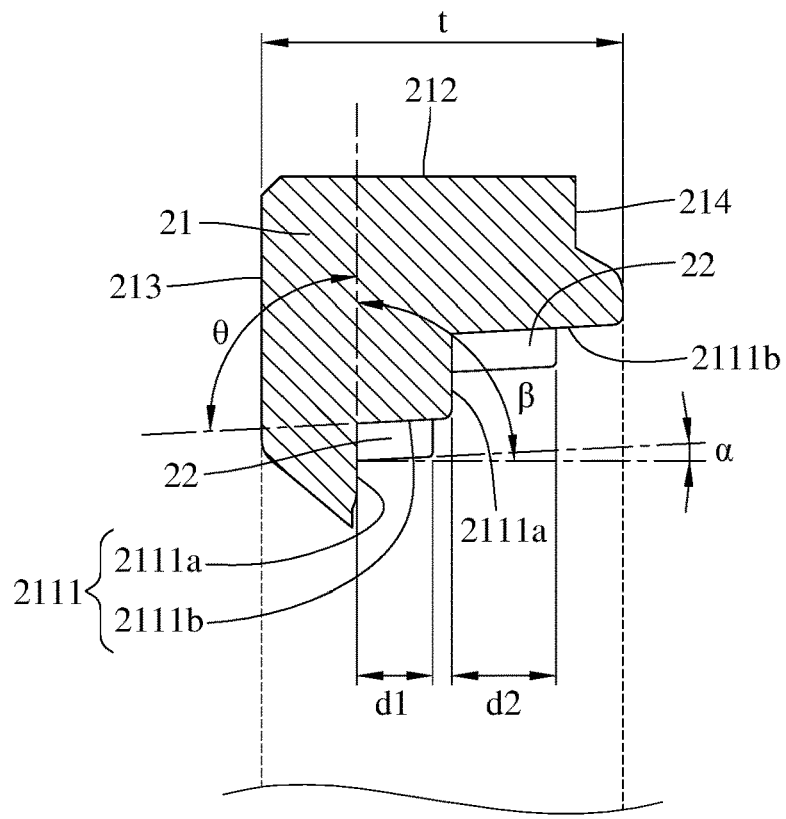
FIG. 8 and FIG. 9 are enlarged views of the annular optical component in FIG. 7.
Figure 9:
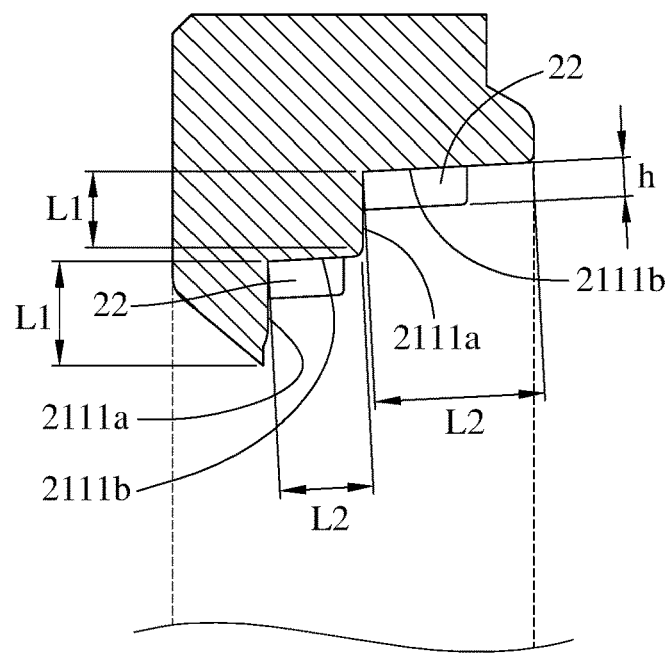

FIG. 7 is a side cross-sectional view of an annular optical component according to the 2nd embodiment of the present disclosure. FIG. 8 and FIG. 9 are enlarged views of the annular optical component in FIG. 7. In this embodiment, an annular optical component includes a main body 21 and a plurality of stripe-shaped structures 22 which are integral with each other.

The main body 21 includes an inner surface 211, an outer surface 212, an object-side surface 213 and an image-side surface 214. The inner surface 211 surrounds a central axis A of the annular optical component and defines a central aperture 215. The outer surface 212 is opposite to the inner surface 211. The object-side surface 213 faces toward an object side of the annular optical component and is connected to the outer surface 212 and the inner surface 211. The image-side surface 214 faces toward an image side of the annular optical component an d is connected to the outer surface 212 and the inner surface 211. The image-side surface 214 is opposite to the object-side surface 213. As shown in FIG. 7, a cross section of the inner surface 211 of the annular optical component in side view is zigzag form.

The inner surface 211 includes two L-shaped annular grooves 2111. One of the two L-shaped annular grooves 2111 closer to the object-side surface 213 is interpreted as an object-side L-shaped annular groove, and the other L-shaped annular groove 2111 closer to the image-side surface 214 is interpreted as an image-side L-shaped annular groove. The two L-shaped annular grooves 2111 are not overlapped with each other in a direction parallel to the central axis A. The stripe-shaped structures 22 are disposed in the L-shaped annular grooves 2111, and the stripe-shaped structures 22 in each L-shaped annular groove 2111 are arranged along a circumferential direction of the annular optical component. In detail, each L-shaped annular groove 2111 includes a first side 2111a and a second side 2111b which are located between the object-side surface 213 and the image-side surface 214. The first side 2111a and the second side 2111b are connected to each other, and the stripe-shaped structures 22 are disposed on the second side 2111b. An end of each stripe-shaped structure 22 contacts the first side 2111a of the L-shaped annular groove 2111, and the other end of each stripe-shaped structure 22 faces toward the image side of the annular optical component. The stripe-shaped structure 22 has a shape similar to the stripe-shaped structure 12 in the first embodiment, and thus detail description for the stripe-shaped structure 22 is omitted hereafter.

A bottom diameter φ2 of the image-side L-shaped annular groove (the L-shaped annular groove 2111 closer to the image-side surface 214) is larger than a bottom diameter φ1 of the object-side L-shaped annular groove (the L-shaped annular groove 2111 closer to the object-side surface 213). A degree of inclination β between the first side 2111a and the central axis A of the annular optical component is larger than a degree of inclination α between the second side 2111b and the central axis A.

In the 2nd embodiment, the definitions of these parameters shown in the following table are the same as those stated in the 1st embodiment with corresponding values for the 2nd embodiment, so an explanation in this regard will not be provided again.

| 2nd embodiment | | | |
|---|---|---|---|
| θ [deg.] | 93.071 | L1/L2 | 1.22 and 0.47 |
| d1/t | 0.21 | α [deg.] | 3.025 |
| d2/t | 0.29 | h [mm] | 0.04 |
| d1/d2 | 0.73 | (φ2 − φ1)/(φo − φi) | 0.26 |

3rd Embodiment

Figure 10:
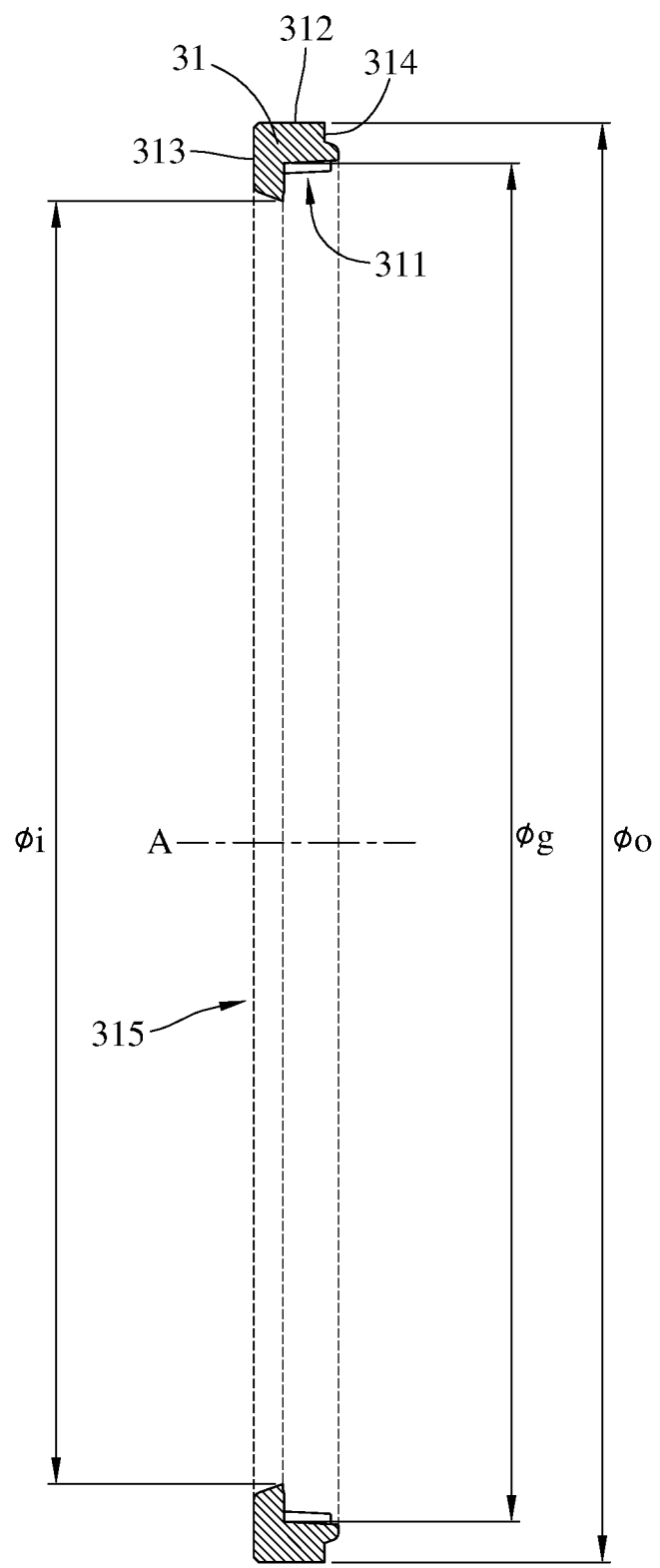
FIG. 10 is a side cross-sectional view of an annular optical component according to the 3rd embodiment of the present disclosure.
Figure 11:
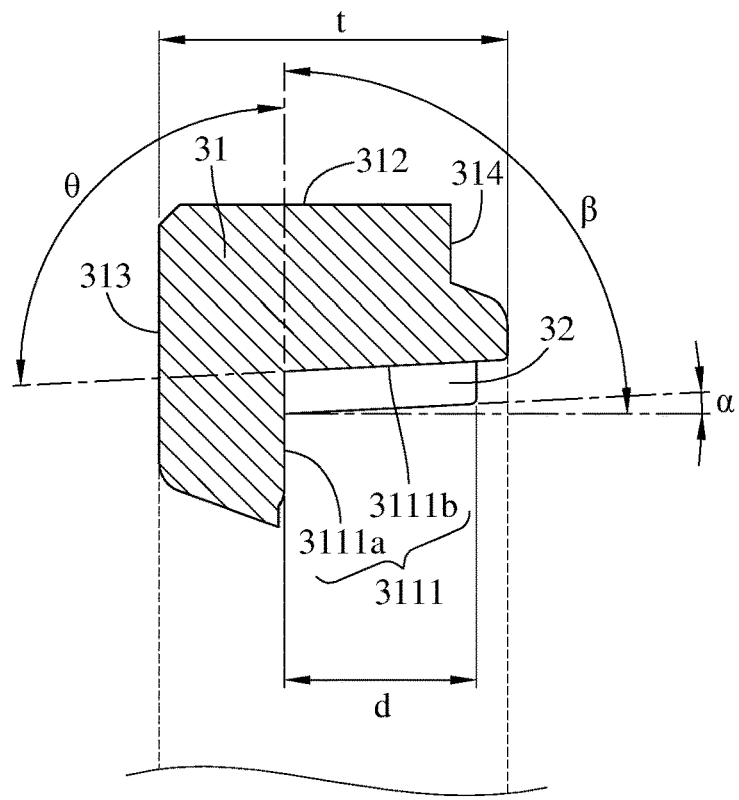
FIG. 11 and FIG. 12 are enlarged views of the annular optical component in FIG. 10.
Figure 12:
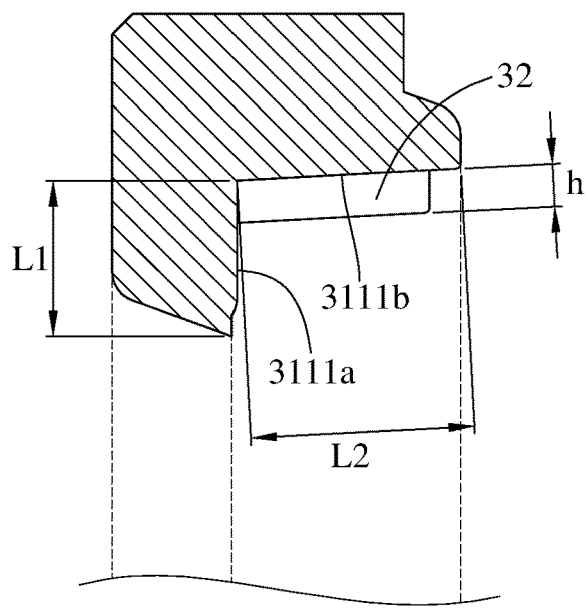

FIG. 10 is a side cross-sectional view of an annular optical component according to the 3rd embodiment of the present disclosure. FIG. 11 and FIG. 12 are enlarged views of the annular optical component in FIG. 10. In this embodiment, an annular optical component includes a main body 31 and a plurality of stripe-shaped structures 32 which are integral with each other.

The main body 31 includes an inner surface 311, an outer surface 312, an object-side surface 313 and an image-side surface 314. The inner surface 311 surrounds a central axis A of the annular optical component and defines a central aperture 315. The outer surface 312 is opposite to the inner surface 311. The object-side surface 313 faces toward an object side of the annular optical component and is connected to the outer surface 312 and the inner surface 311. The image-side surface 314 faces toward an image side of the annular optical component and is connected to the outer surface 312 and the inner surface 311. The image-side surface 314 is opposite to the object-side surface 313. As shown in FIG. 10, a cross section of the inner surface 311 of the annular optical component in side view is zigzag form.

The inner surface 311 includes single L-shaped annular groove 3111. The stripe-shaped structures 32 are disposed in the L-shaped annular groove 3111, and the stripe-shaped structures 32 in the L-shaped annular groove 3111 are arranged along a circumferential direction of the annular optical component. In detail, the L-shaped annular groove 3111 includes a first side 3111a and a second side 3111b which are located between the object-side surface 313 and the image-side surface 314. The first side 3111a and the second side 3111b are connected to each other, and the stripe-shaped structures 32 are disposed on the second side 3111b. The stripe-shaped structure 32 has a shape similar to the stripe-shaped structure 12 in the first embodiment, and thus detail description for the stripe-shaped structure 32 is omitted hereafter. A degree of inclination β between the first side 3111a and the central axis A of the annular optical component is larger than a degree of inclination α between the second side 3111b and the central axis A.

When an angle between the first side 3111a and the second side 3111b of the L-shaped annular groove 3111 is θ, the following condition is satisfied: θ=93.071 degrees.

When a thickness of the annular optical component is t, and a length of each of the stripe-shaped structures 32 disposed in the L-shaped annular groove 3111 is d, the following condition is satisfied: d/t=0.56.

When a width of the first side 3111a of the L-shaped annular groove 3111 is L1, and a width of the second side 3111b of the L-shaped annular groove 3111 is L2, the following condition is satisfied: L1/L2=0.71.

When the degree of inclination between the second side 3111b and the central axis A of the annular optical component is α, the following condition is satisfied: α=3.306 degrees.

The stripe-shaped structures 32 have even height. When a height of each of the stripe-shaped structures 32 is h, the following condition is satisfied: h=0.04 mm.

When a bottom diameter of the L-shaped annular groove 3111 is φg, a diameter of the outer surface 312 is φo, and a diameter of the inner surface 311 is φi, the following condition is satisfied: (φo−φg)/(φg−φi)=1.07.

4th Embodiment

Figure 13:
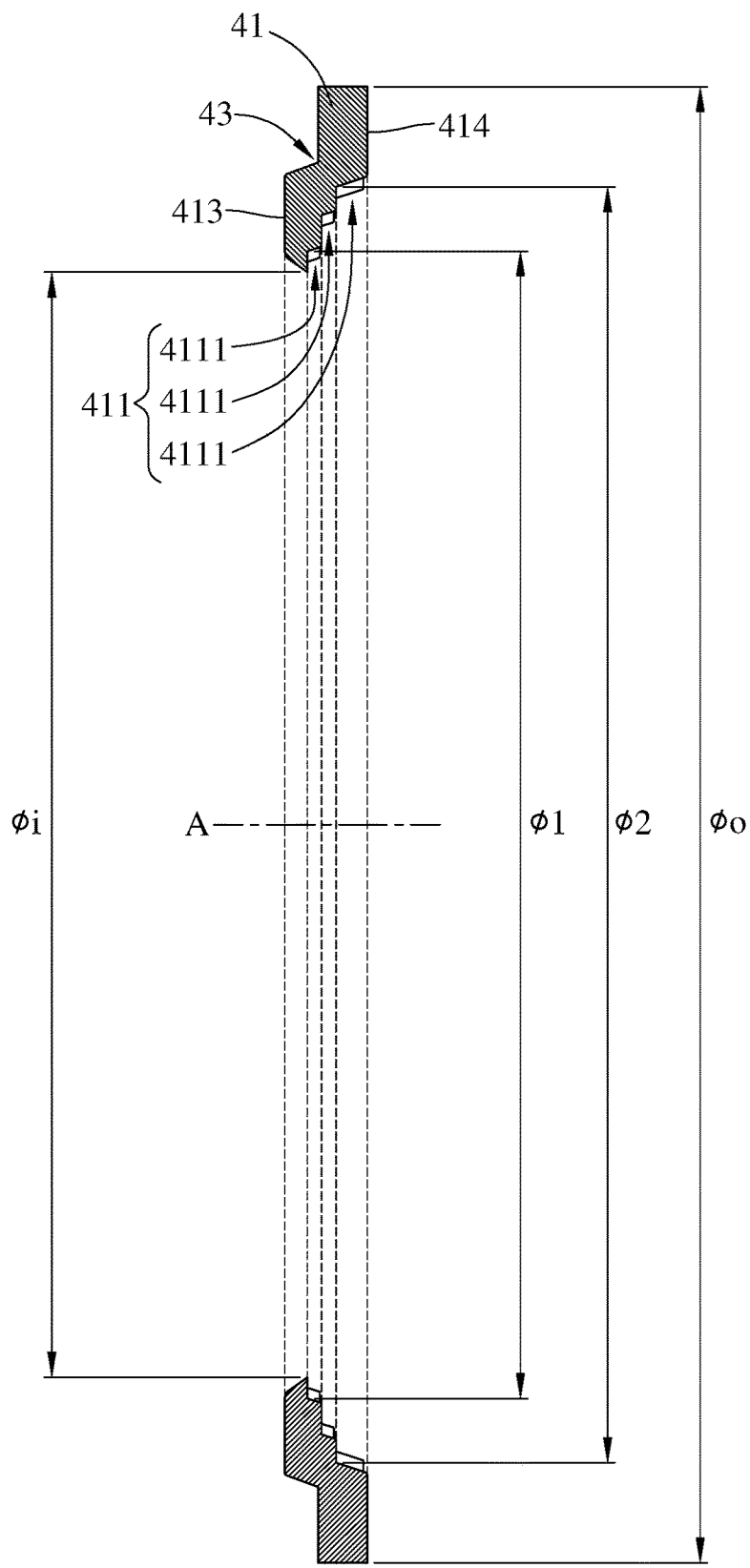
FIG. 13 is a side cross-sectional view of an annular optical component according to the 4th embodiment of the present disclosure.
Figure 14:
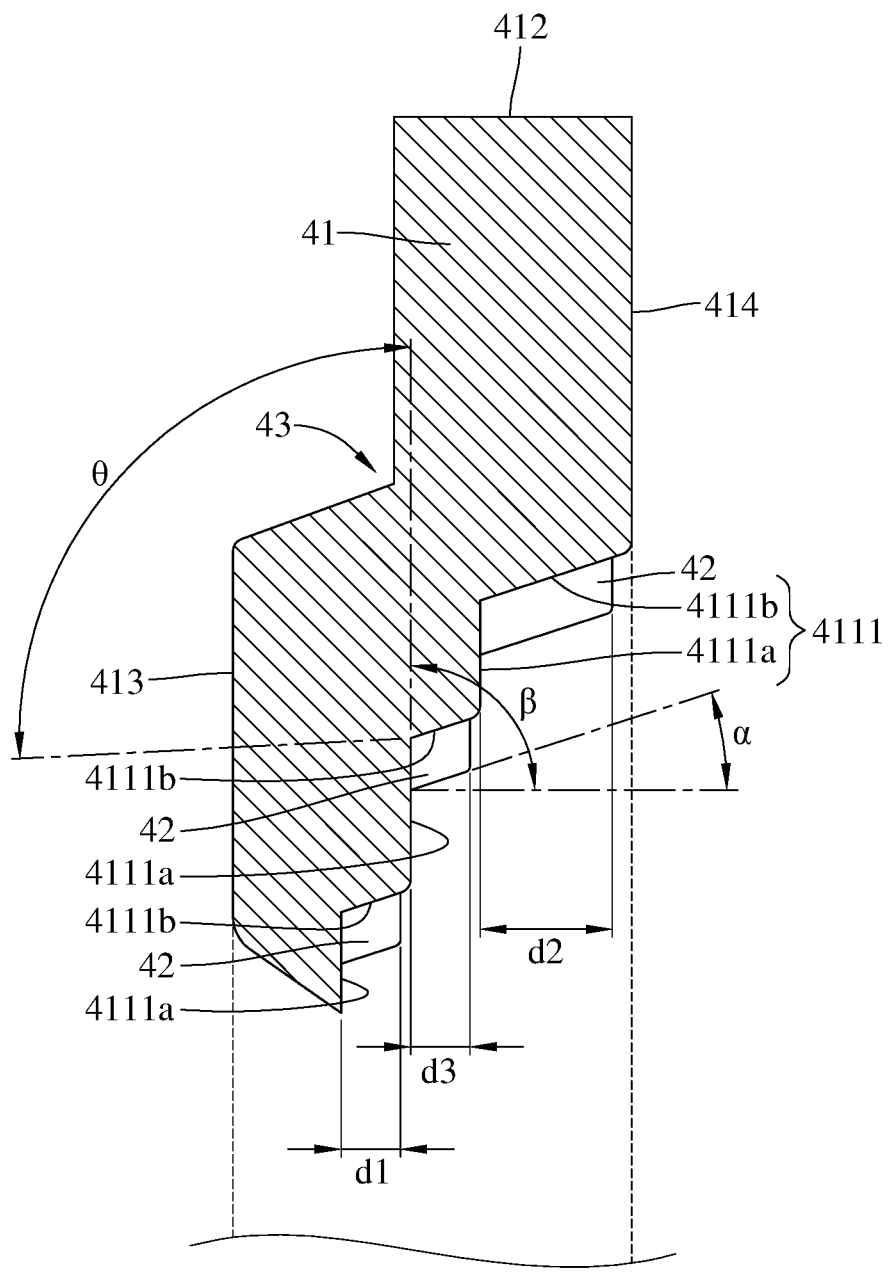
FIG. 14 and FIG. 15 are enlarged views of the annular optical component in FIG. 13.
Figure 15:
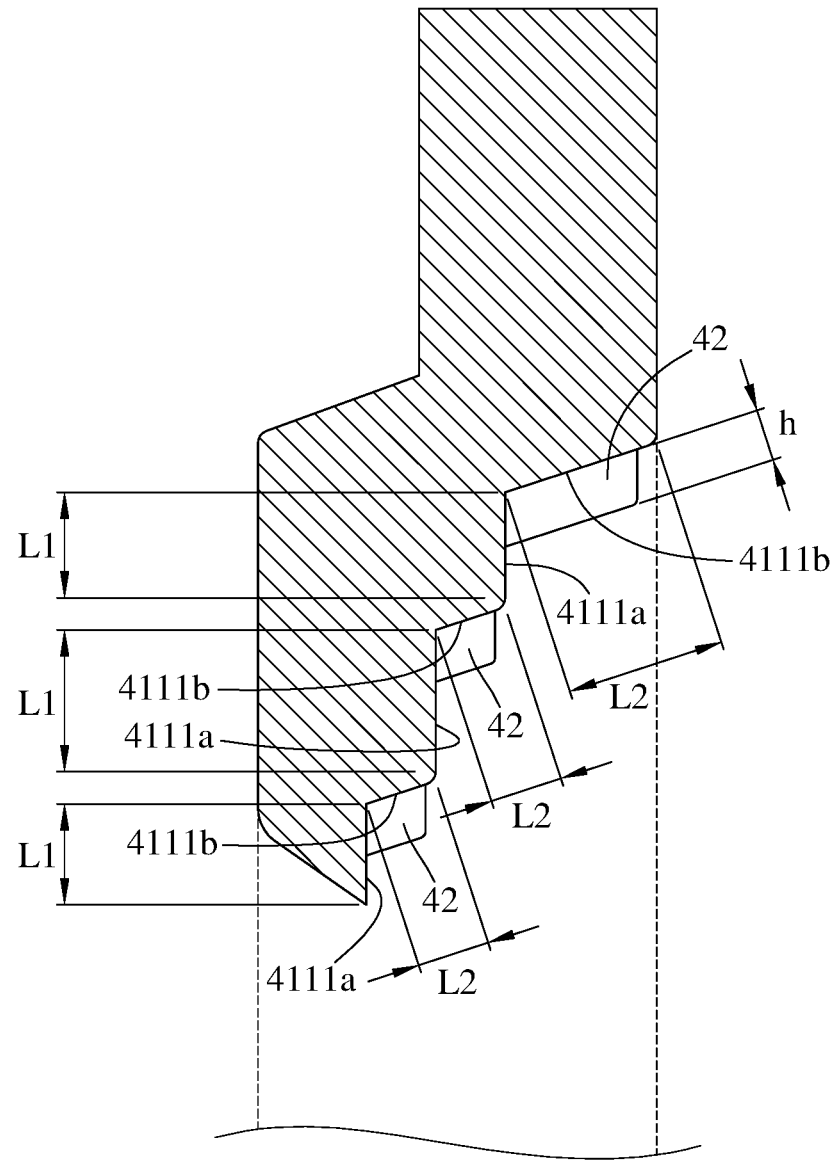

FIG. 13 is a side cross-sectional view of an annular optical component according to the 4th embodiment of the present disclosure. FIG. 14 and FIG. 15 are enlarged views of the annular optical component in FIG. 13. In this embodiment, an annular optical component includes a main body 41, a plurality of stripe-shaped structures 42 and an axial assembling structure 43. The annular optical component is able to be disposed in an optical lens assembly (not shown in the drawings) by the axial assembling structure 43.

The main body 41 includes an inner surface 411, an outer surface 412, an object-side surface 413 and an image-side surface 414. The inner surface 411 surrounds a central axis A of the annular optical component and defines a central aperture 415. The outer surface 412 is opposite to the inner surface 411. The object-side surface 413 faces toward an object side of the annular optical component and is connected to the outer surface 412 and the inner surface 411. The image-side surface 414 faces toward an image side of the annular optical component and is connected to the outer surface 412 and the inner surface 411. The image-side surface 414 is opposite to the object-side surface 413. As shown in FIG. 13, a cross section of the inner surface 411 of the annular optical component in side view is zigzag form.

The inner surface 411 includes three L-shaped annular grooves 4111. One of the L-shaped annular grooves 4111 closest to the object-side surface 313 is interpreted as an object-side L-shaped annular groove, another L-shaped annular groove 4111 closest to the image-side surface 314 is interpreted as an image-side L-shaped annular groove, and the other L-shaped annular groove 4111 located between the object-side L-shaped annular groove and the image-side L-shaped annular groove is interpreted as a middle L-shaped annular groove. The three L-shaped annular grooves 4111 are not overlapped with each other in a direction parallel to the central axis A. Each L-shaped annular groove 4111 includes a first side 4111a and a second side 4111b which are located between the object-side surface 413 and the image-side surface 414. The first side 4111*a* and the second side 4111*b* are connected to each other, and the stripe-shaped structures 42 are disposed on the second side 4111*b*. An end of each stripe-shaped structure 42 contacts the first side 4111*a* of the L-shaped annular groove 4111, and the other end of each stripe-shaped structure 42 faces toward the image side of the annular optical component. The stripe-shaped structure 42 has a shape similar to the stripe-shaped structure 12 in the first embodiment, and thus detail description for the stripe-shaped structure 42 is omitted hereafter.

A bottom diameter φ2 of the image-side L-shaped annular groove (the L-shaped annular groove 4111 closest to the image-side surface 414) is larger than a bottom diameter φ1 of the object-side L-shaped annular groove (the L-shaped annular groove 4111 closest to the object-side surface 413). A degree of inclination β between the first side 4111*a* and the central axis A of the annular optical component is larger than a degree of inclination α between the second side 4111*b* and the central axis A.

When an angle between the first side 4111*a* and the second side 4111*b* of the L-shaped annular groove 4111 is θ, the following condition is satisfied: θ=108 degrees.

When a thickness of the annular optical component is t, and a length of each of the stripe-shaped structures 42 disposed in the object-side L-shaped annular groove is d1, the following condition is satisfied: d1/t=0.28.

When the thickness of the annular optical component is t, and a length of each of the stripe-shaped structures 42 disposed in the image-side L-shaped annular groove is d2, the following condition is satisfied: d2/t=0.56.

When the thickness of the annular optical component is t, and a length of each of the stripe-shaped structures 42 disposed in the middle L-shaped annular groove is d3, the following condition is satisfied: d3/t=0.28.

When the length of each of the stripe-shaped structures 42 disposed in the object-side L-shaped annular groove is d1, and the length of each of the stripe-shaped structures 42 disposed in the image-side L-shaped annular groove is d2, the following condition is satisfied: d1/d2=0.50.

When a width of the first side 4111*a* of the object-side L-shaped annular groove is L1, and a width of the second side 4111*b* of the object-side L-shaped annular groove is L2, the following condition is satisfied: L1/L2=1.60.

When a width of the first side 4111*a* of the image-side L-shaped annular groove is L1, and a width of the second side 4111*b* of the image-side L-shaped annular groove is L2, the following condition is satisfied: L1/L2=0.73.

When a width of the first side 4111*a* of the middle L-shaped annular groove is L1, and a width of the second side 4111*b* of the middle L-shaped annular groove is L2, the following condition is satisfied: L1/L2=2.20.

When the degree of inclination between the second side 4111*b* and the central axis A of the annular optical component is α, the following condition is satisfied: α=17.955 degrees.

The stripe-shaped structures 42 have even height. When a height of each of the stripe-shaped structures 42 is h, the following condition is satisfied: h=0.04 mm.

When a the bottom diameter of the object-side L-shaped annular groove is φ1, a bottom diameter of the image-side L-shaped annular groove is φ2, a diameter of the outer surface 412 is φo, and a diameter of the inner surface 411 is φi, the following condition is satisfied: (φ2−φ1)/(φo−φi) =0.35.

5th Embodiment

Figure 16:
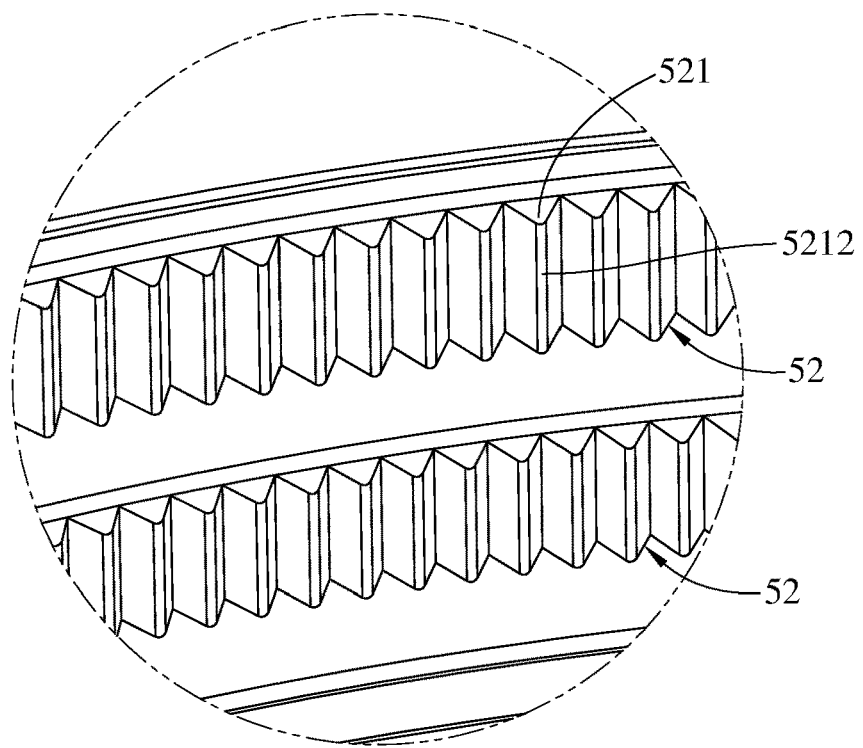
FIG. 16 is an enlarged view of an annular optical component according to the 5th embodiment of the present disclosure.

FIG. 16 is an enlarged view of an annular optical component according to the 5th embodiment of the present disclosure. In this embodiment, an annular optical component includes a plurality of stripe-shaped structures 52, and each stripe-shaped structure 52 includes a tapered portion 521. Compared to the tapered portion 121 of the stripe-shaped structure 12, including a wedge-shaped tip 1212, in the first embodiment, a tip 5212 of the tapered portion 521 has arc form.

6th Embodiment

Figure 17:
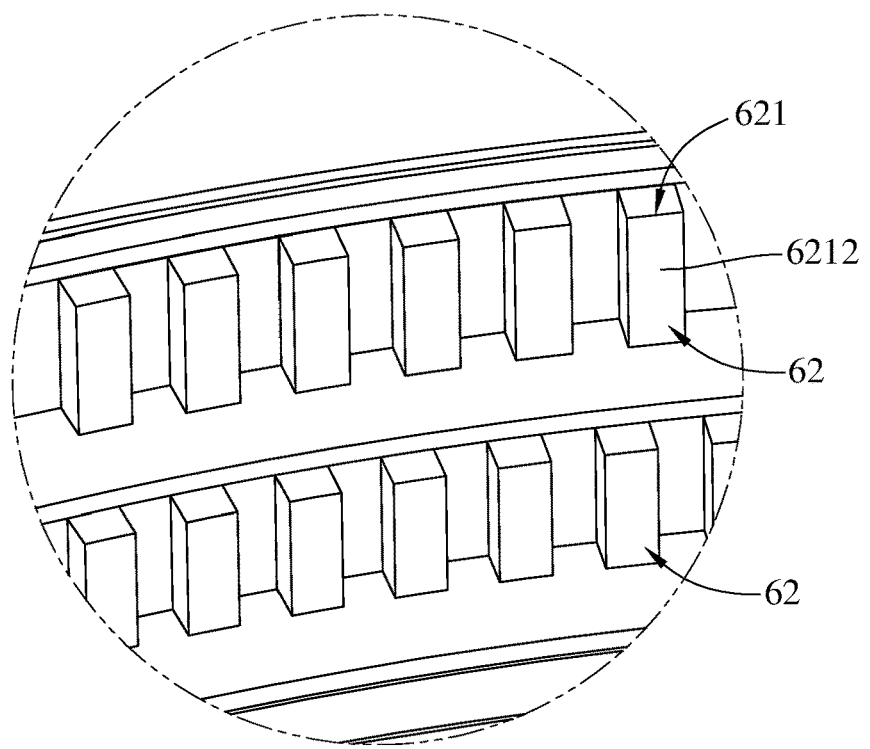
FIG. 17 is an enlarged view of an annular optical component according to the 6th embodiment of the present disclosure.

FIG. 17 is an enlarged view of an annular optical component according to the 6th embodiment of the present disclosure. In this embodiment, an annular optical component includes a plurality of stripe-shaped structures 62, and each stripe-shaped structure 62 includes a tapered portion 621. A tip 6212 of the tapered portion 621 has a rectangular top surface.

7th Embodiment

Figure 18:
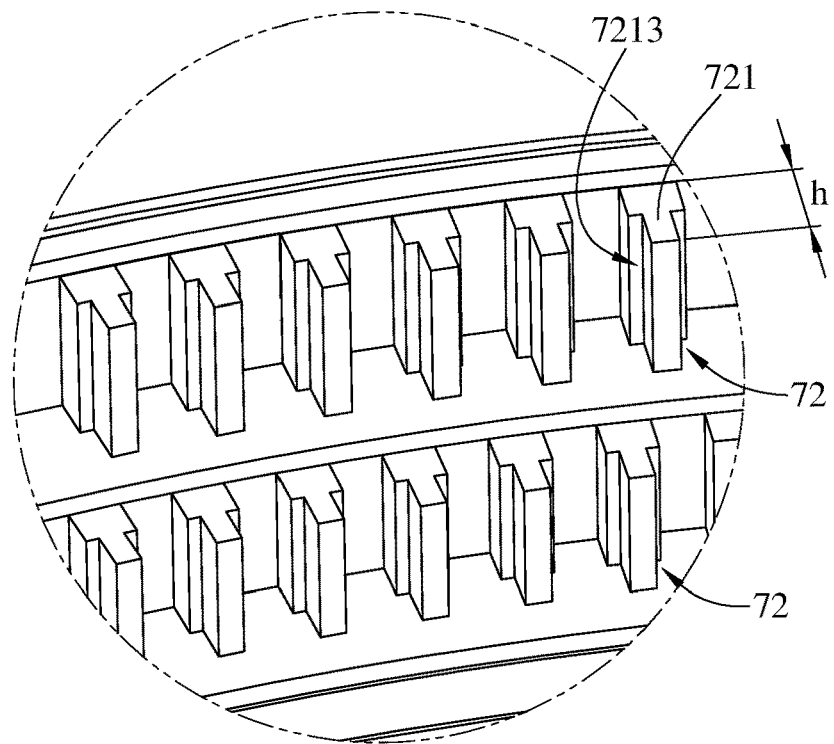
FIG. 18 is an enlarged view of an annular optical component according to the 7th embodiment of the present disclosure.

FIG. 18 is an enlarged view of an annular optical component according to the 7th embodiment of the present disclosure. In this embodiment, an annular optical component includes a plurality of stripe-shaped structures 72, and each stripe-shaped structure 72 includes a tapered portion 721. Compared to the tapered portion 121 of the stripe-shaped structure 12, including two smooth inclined surfaces 1213, in the first embodiment, the tapered portion 721 includes two inclined surfaces 7213 which have zigzag form.

The stripe-shaped structures 72 have even height. When a height of each of the stripe-shaped structures 72 is h, the following condition is satisfied: h=0.08 mm.

8th Embodiment

Figure 19:
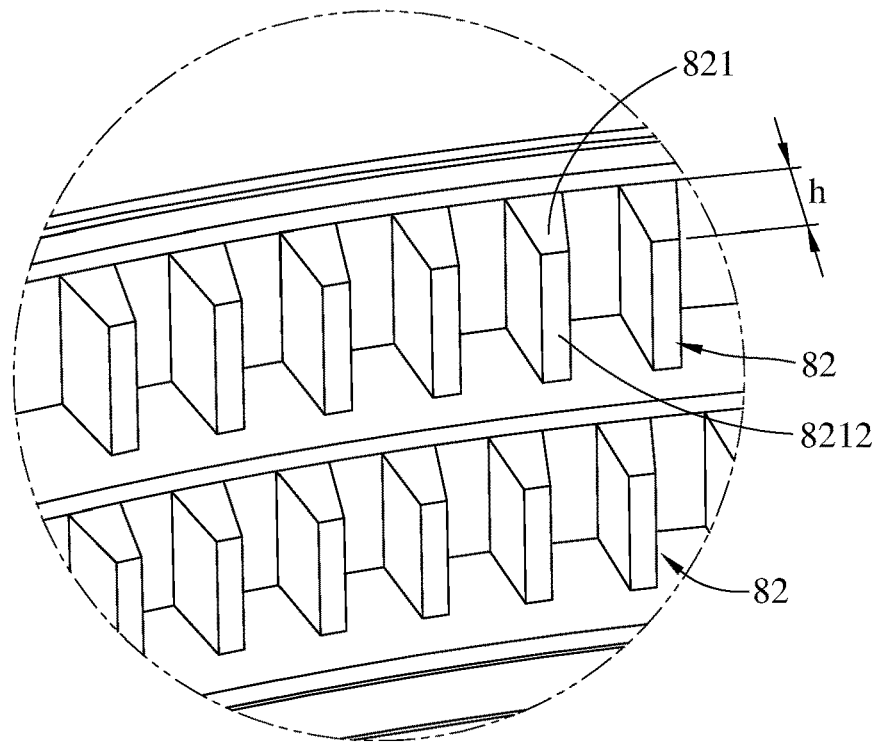
FIG. 19 is an enlarged view of an annular optical component according to the 8th embodiment of the present disclosure.

FIG. 19 is an enlarged view of an annular optical component according to the 8th embodiment of the present disclosure. In this embodiment, an annular optical component includes a plurality of stripe-shaped structures 82, and each stripe-shaped structure 82 includes a tapered portion 821. A tip 8212 of the tapered portion 821 has a rectangular top surface.

The stripe-shaped structures 82 have even height. When a height of each of the stripe-shaped structures 82 is h, the following condition is satisfied: h=0.08 mm.

9th Embodiment

Figure 20:
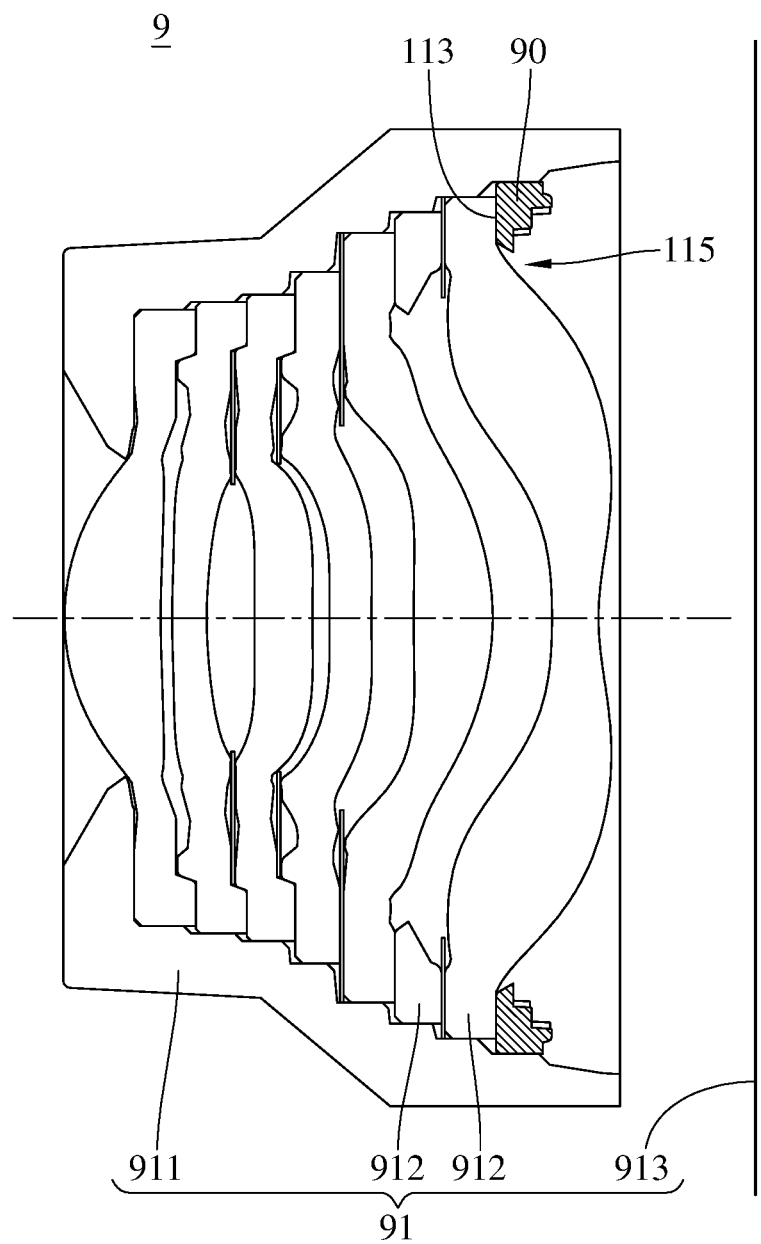
FIG. 20 is a schematic view of a lens module according to the 9th embodiment of the present disclosure.

FIG. 20 is a schematic view of a lens module according to the 9th embodiment of the present disclosure. In this embodiment, a lens module 9 includes an annular optical component 90 and an optical lens assembly 91.

The annular optical component 90, for example, is the annular optical component disclosed in the 1st embodiment. The optical lens assembly 91 includes a barrel 911, multiple lens elements 912 and an image sensor 913. The annular optical component 90 and the lens elements 912 are disposed ibn the barrel 911. The annular optical component 90 is a fixing ring, and the object-side surface 113 of the annular optical component 90 contacts one of the lens elements 912, such that the axial distances between every pair of two adjacent lens elements 912 is determined by the annular optical component 90. The central aperture 115 of the annular optical component 90 is configured to allow light to pass through the lens module 9.

10th Embodiment

Figure 21:
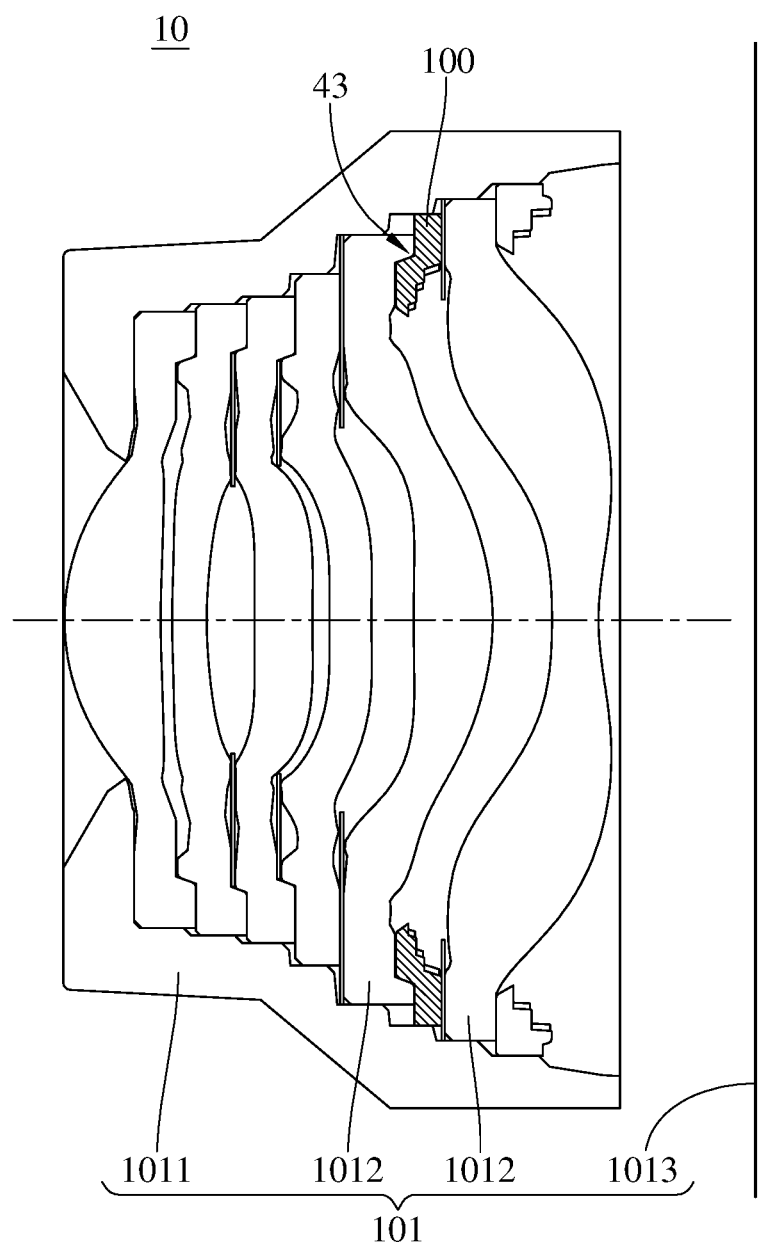
FIG. 21 is a schematic view of a lens module according to the 10th embodiment of the present disclosure.

FIG. 21 is a schematic view of a lens module according to the 10th embodiment of the present disclosure. In this embodiment, a lens module 10 includes an annular optical component 100 and an optical lens assembly 101. The annular optical component 100, for example, is the annular optical component disclosed in the 4th embodiment. The optical lens assembly 101 includes a barrel 1011, multiple lens elements 1012 and an image sensor 1013. The annular optical component 100 and the lens elements 1012 are disposed ibn the barrel 1011.

The annular optical component 100 includes the axial assembling structure 43. The annular optical component 100 is disposed on one of the lens elements 1012 by the axial assembling structure 43. Moreover, the axial assembling structure 43 is configured to align a central axis of the annular optical component 100 with a center of the lens element 1012 which is adjacent to the annular optical component 100.

11th Embodiment

Figure 22:
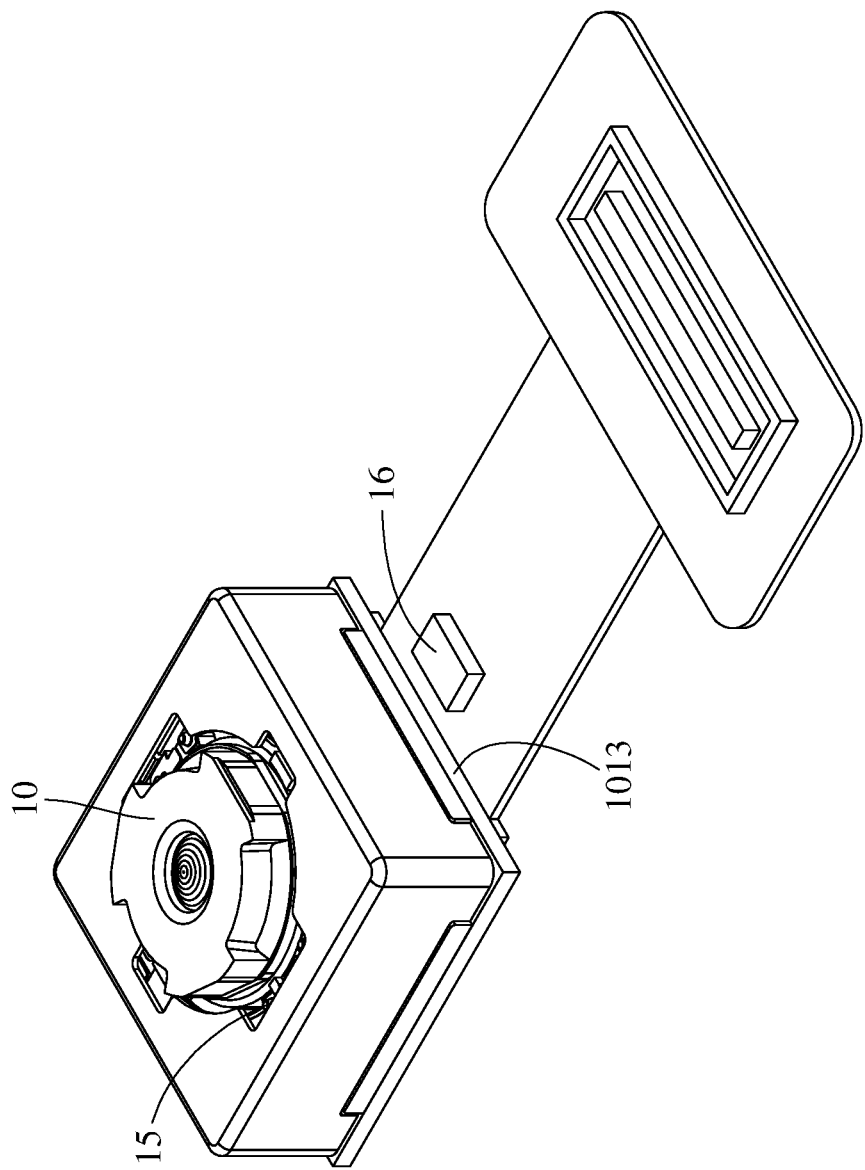
FIG. 22 is a perspective view of an image capturing unit according to the 11th embodiment of the present disclosure.

FIG. 22 is a perspective view of an image capturing unit according to the 11th embodiment of the present disclosure. In this embodiment, an image capturing unit 14 includes the lens module 10 disclosed in the 10th embodiment, a driving device 15 and an image stabilizer 16. The lens module 10 further includes a holder member (their reference numerals are omitted) for holding the optical lens assembly. The light converges in the lens module 10 of the image capturing unit 14 to generate an image with the driving device 15 utilized for image focusing on the image sensor 1013. The image sensor 1013 (for example, CCD or CMOS), which can feature high photosensitivity and low noise, is provided for higher image quality.

The driving device 15 can have auto focusing functionality, and different driving configurations can be obtained through the usages of voice coil motors (VCM), micro electro-mechanical systems (MEMS), piezoelectric systems, or shape memory alloy materials. The driving device 15 is favorable for obtaining a better imaging position of the lens module 10, so that a clear image of the imaged object can be captured by the lens module 10 with different object distances.

The image stabilizer 16, such as an accelerometer, a gyro sensor and a Hall Effect sensor, is configured to work with the driving device 15 to provide optical image stabilization (OIS). The driving device 15 working with the image stabilizer 16 is favorable for compensating for pan and tilt of the lens module 10 to reduce blurring associated with motion during exposure. In some cases, the compensation can be provided by electronic image stabilization (EIS) with image processing software, thereby improving image quality while in motion or low-light conditions.

Figure 23:
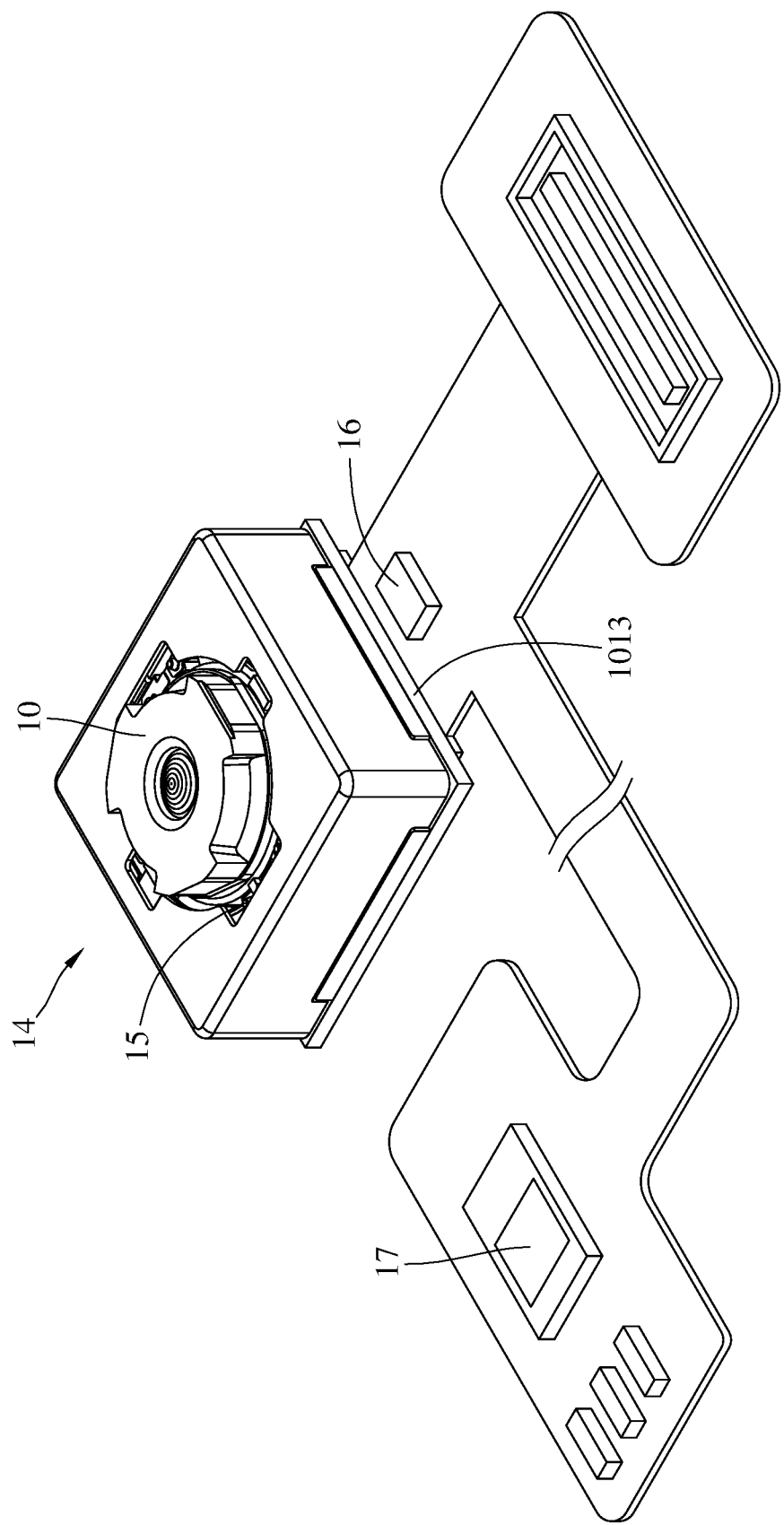
FIG. 23 is a perspective view of an image capturing unit according to another embodiment of the present disclosure.

The present disclosure is not limited to the image capturing unit 14 in FIG. 22. FIG. 23 is a perspective view of an image capturing unit according to another embodiment of the present disclosure, wherein the image capturing unit 14 further includes a flash module 17 activated for light supplement.

Figure 24:
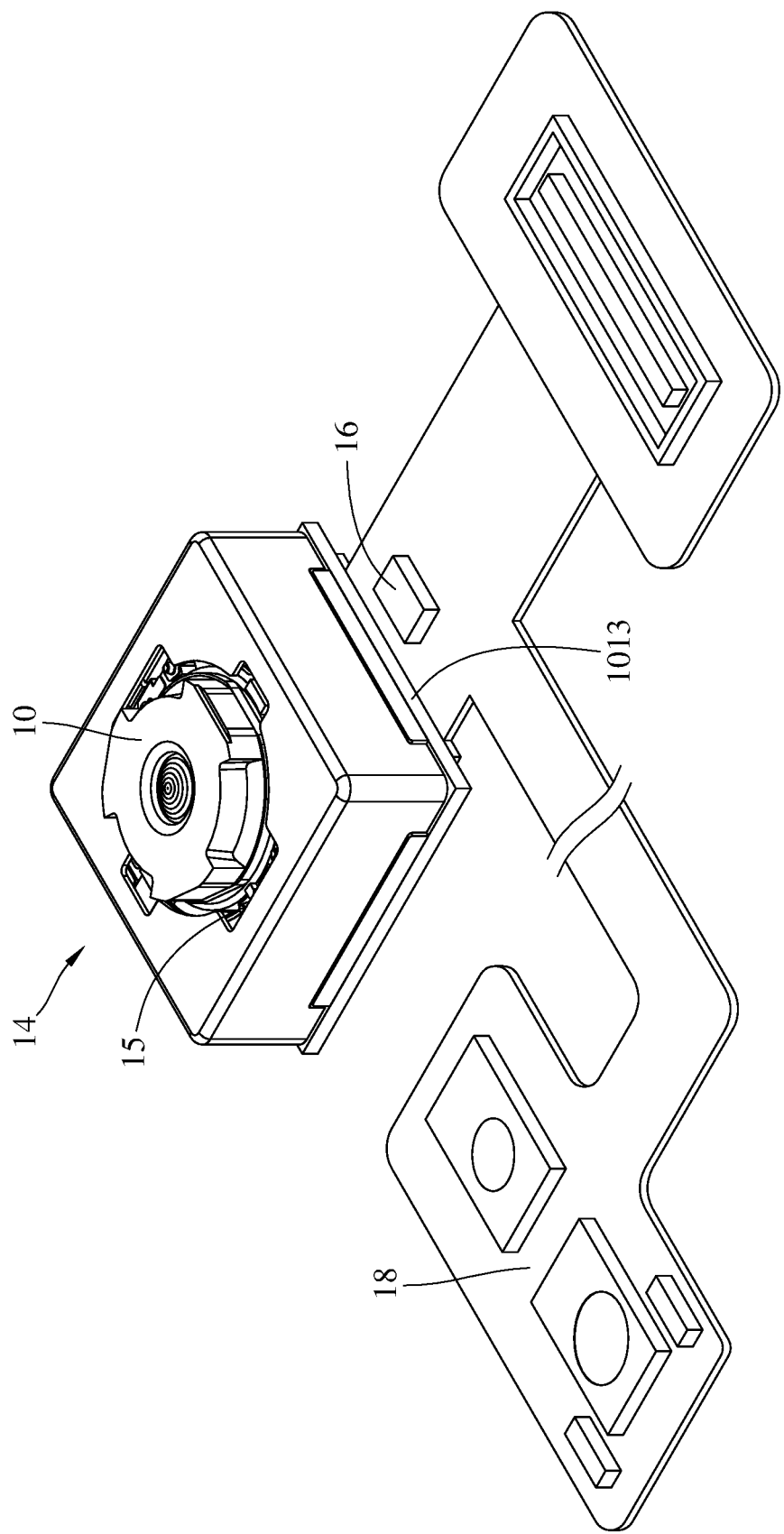
FIG. 24 is a perspective view of an image capturing unit according to still another embodiment of the present disclosure.

FIG. 24 is a perspective view of an image capturing unit according to still another embodiment of the present disclosure, wherein the image capturing unit 14 further includes a focus assist module 18 configured to detect an object distance to achieve fast auto focusing. The light beam emitted from the focus assist module 18 can be either conventional infrared or laser.

12th Embodiment

Figure 25:
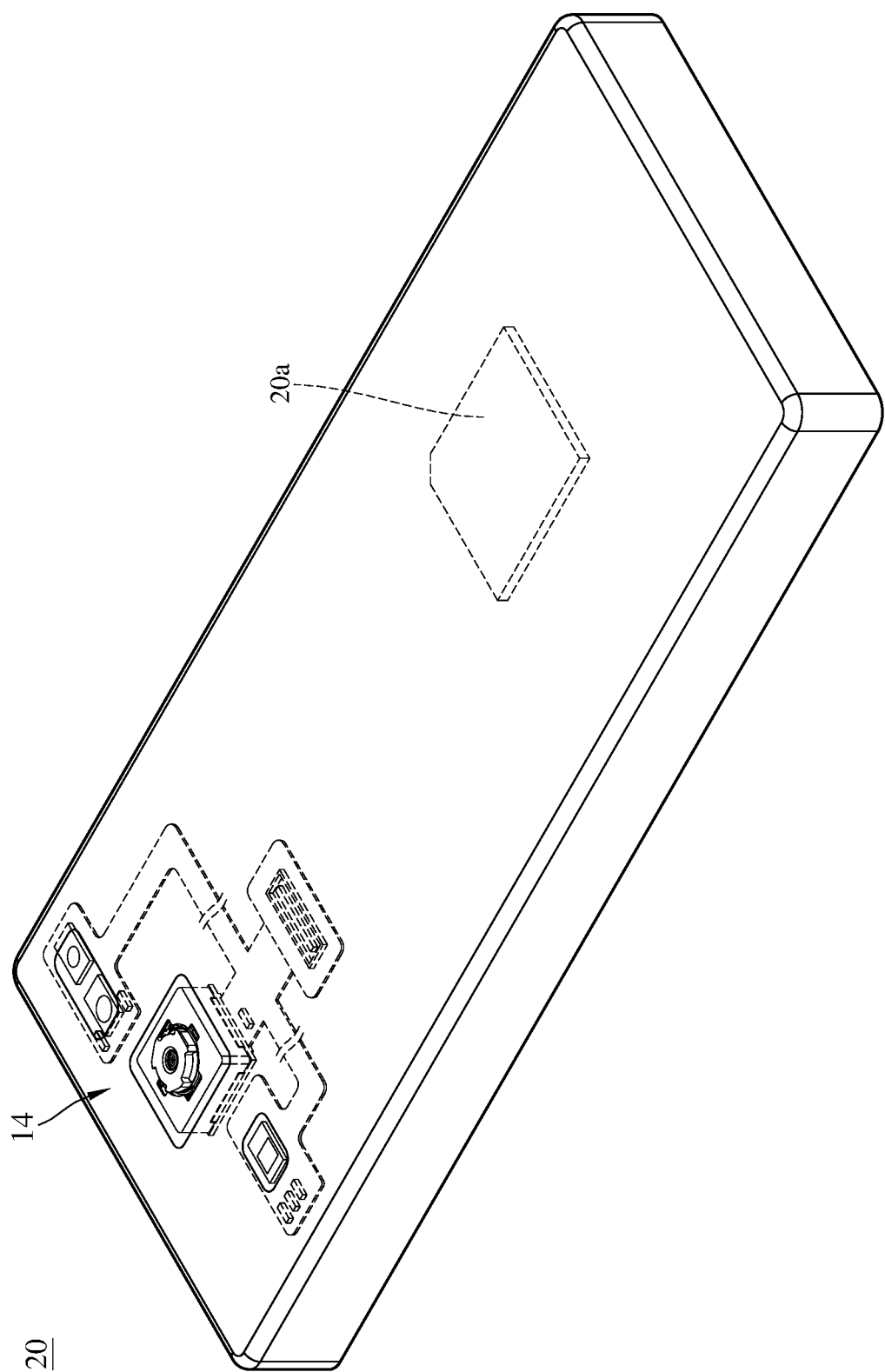
FIG. 25 is a perspective view of an electronic device according to the 12th embodiment of the present disclosure.
Figure 26:
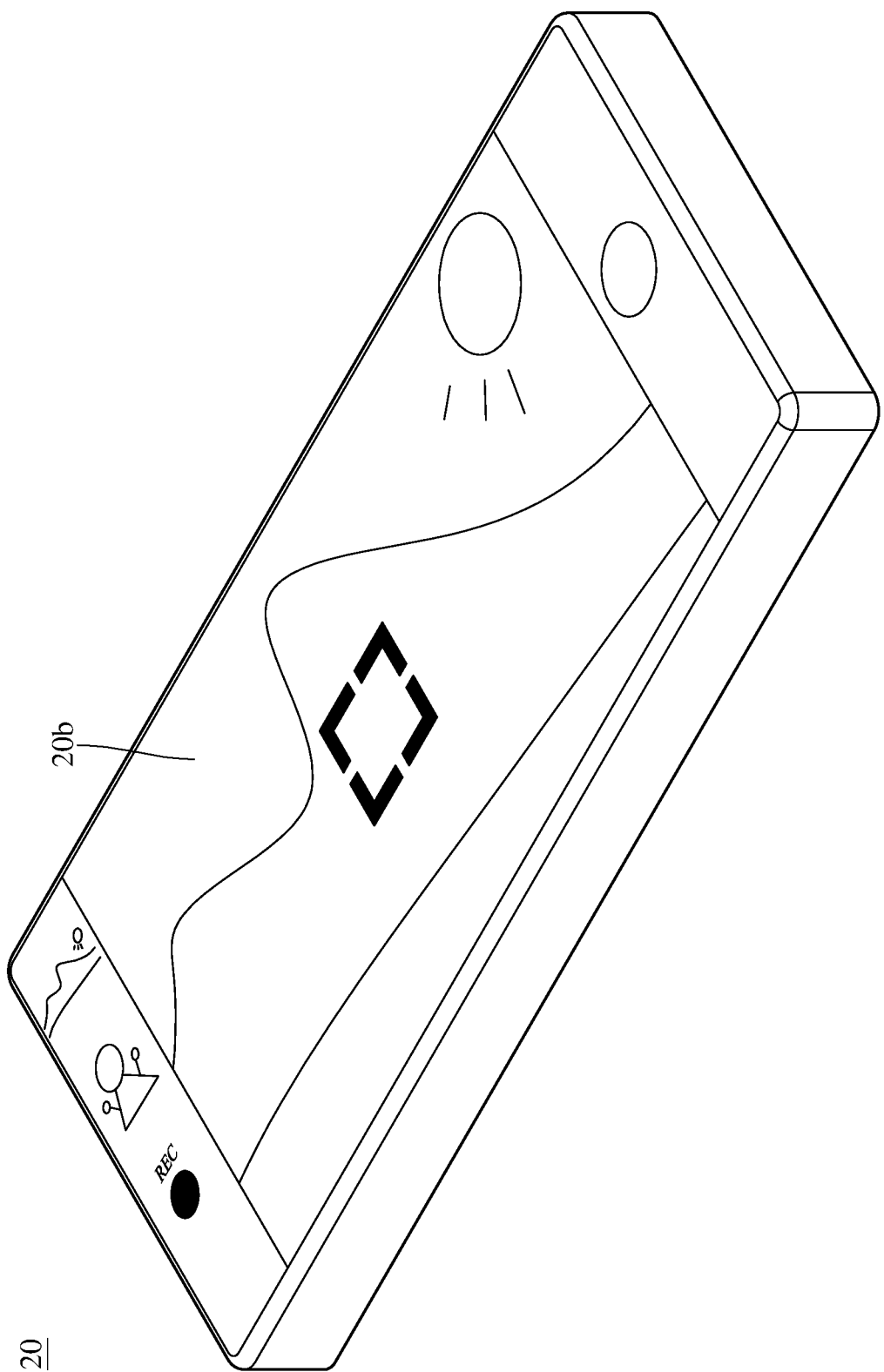
FIG. 26 is another perspective view of the electronic device in FIG. 25.

FIG. 25 is a perspective view of an electronic device according to the 12th embodiment of the present disclosure. FIG. 26 is another perspective view of the electronic device in FIG. 25. In this embodiment, an electronic device 20 is a smartphone including the image capturing unit 14 disclosed in the 11th embodiment, an image signal processor 20a, an user interface 20b and an image software processor (not shown in the drawings). The image capturing unit 14 includes a lens module, a driving device, an image stabilizer, a flash module and a focus assist module, but the disclosure is not limited thereto.

When a user captures images of an object, the light rays converge in the image capturing unit 14 to generate an image. The image signal processor is configured to optimize the captured image to improve image quality. The user interface 20b can be a touch screen or a physical button. The user is able to interact with the user interface 20b and the image software processor having multiple functions to capture images and complete image processing. The image processed by the image software processor can be displayed on the user interface 20b.

Figure 27:
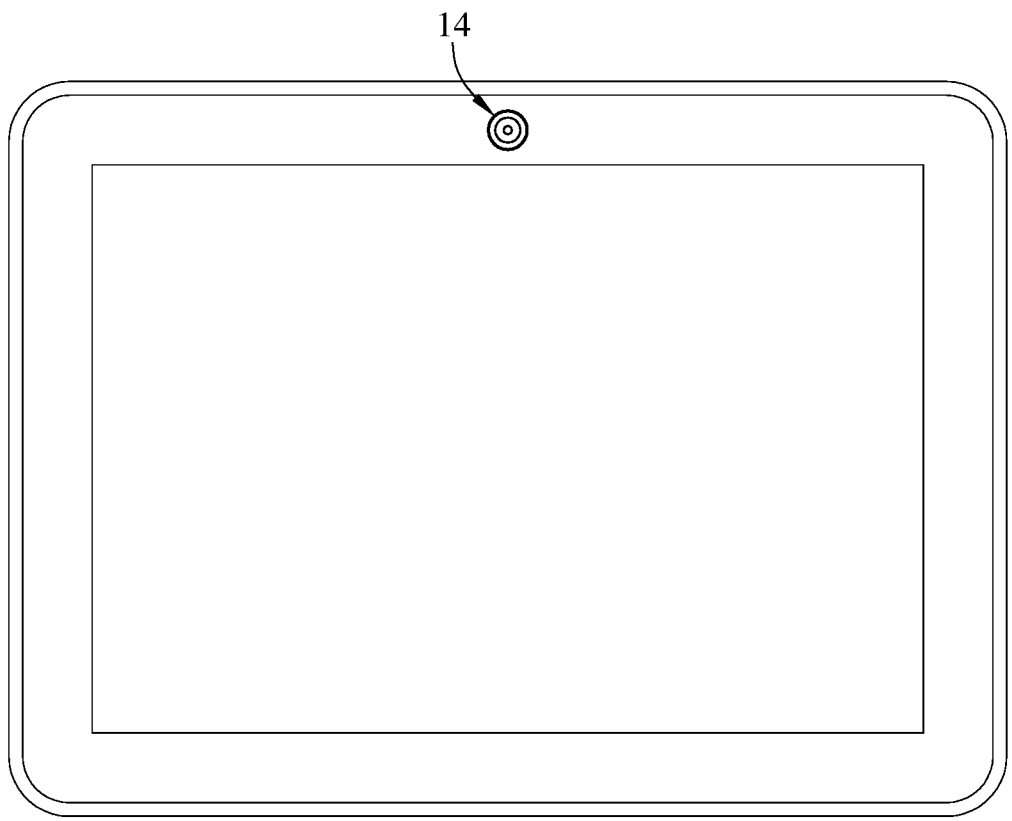
FIG. 27 is a perspective view of an electronic device according to another embodiment of the present disclosure.
Figure 28:
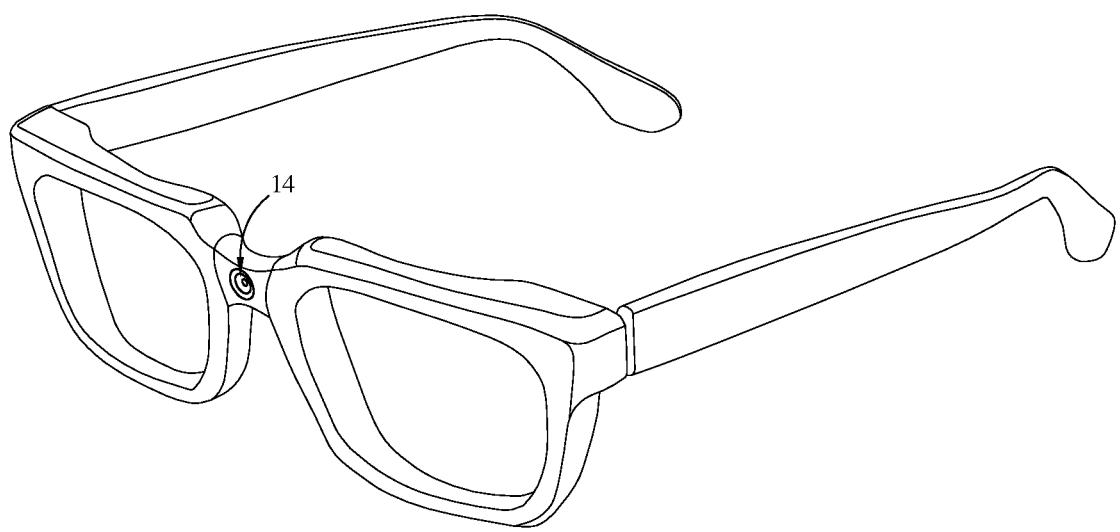
FIG. 28 is a perspective view of an electronic device according to still another embodiment of the present disclosure.

The smartphone in this embodiment is only exemplary for showing the image capturing unit 14 of the present disclosure installed in an electronic device, including a tablet personal computer (FIG. 27) or a wearable device (FIG. 28), and the present disclosure is not limited thereto. The image capturing unit 14 can be optionally applied to optical systems with a movable focus. Furthermore, the image capturing unit 14, including the annular optical component, features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:
1. A lens module, comprising:
a barrel;
an optical lens assembly, disposed in the barrel; and
an annular light trapping component, disposed in the barrel, the barrel and the annular light trapping component being independent pieces, and the annular light trapping component comprising:

an inner surface surrounding a central axis of the annular light trapping component, and the inner surface defining a central aperture;

an outer surface opposite to the inner surface;

an object-side surface facing toward an object side of the annular light trapping component, the object-side surface being connected to the inner surface and the outer surface;

an image-side surface facing toward an image side of the annular light trapping component, the image-side surface being connected to the inner surface and the outer surface, and the image-side surface being opposite to the object-side surface;

wherein the inner surface comprises a plurality of L-shaped annular grooves, the annular light trapping component comprises a plurality of stripe-shaped structures disposed in the L-shaped annular grooves, a light trapping structure is formed between every pair of the stripe-shaped structures, and the stripe-shaped structures are arranged along a circumferential direction of the annular light trapping component;

wherein the L-shaped annular grooves comprise an object-side L-shaped annular groove closest to the object-side surface and an image-side L-shaped annular groove closest to the image-side surface, a bottom diameter of the image-side L-shaped annular groove is larger than a bottom diameter of the object-side L-shaped annular groove, and the bottom diameter of the image-side L-shaped annular groove and the bottom diameter of the object-side L-shaped annular groove are closest to the image side of the annular light trapping component;

wherein each of the L-shaped annular grooves comprises a first side and a second side connected to each other, the first side and the second side are located between the object-side surface and the image-side surface, the stripe-shaped structures are disposed on one of the first side and the second side, an end of the stripe-shaped structures is facing and connected to the other side other than the one of the first side and the second side, and a degree of inclination between the first side and the central axis is larger than a degree of inclination between the second side and the central axis;

wherein each of the stripe-shaped structures is a stripe and wedge-shaped structure with a wedge-shaped cross section, and each of the stripe-shaped structures extends from the object side to the image side;

wherein a thickness of the annular light trapping component is t, a length of each of the stripe-shaped structures is d, and the following condition is satisfied:

$0.05<d/t<0.50.$

2. The lens module of claim 1, wherein the annular light trapping component comprises a main body and the stripe-shaped structures integral with each other, the main body comprises the inner surface, the outer surface, the object-side surface and the image-side surface.

3. The lens module of claim 2, wherein an angle between the first side and the second side of each of the L-shaped annular grooves is θ, and the following condition is satisfied:

46 degrees $<θ<136$ degrees.

4. The lens module of claim 3, wherein the L-shaped annular grooves are not overlapped with each other in a direction parallel to the central axis.

5. The lens module of claim 3, wherein the angle between the first side and the second side of each of the L-shaped annular grooves is θ, and the following condition is satisfied:

64 degrees $<θ<116$ degrees.

6. The lens module of claim 5, wherein a number of the L-shaped annular grooves is two, and the two L-shaped annular grooves are respectively the object-side L-shaped annular groove and the image-side L-shaped annular groove;

wherein a length of each of the stripe-shaped structures disposed in the object-side L-shaped annular groove is d1, a length of each of the stripe-shaped structures disposed in the image-side L-shaped annular groove is d2, and the following condition is satisfied:

$0.40<d1/d2<2.5.$

7. The lens module of claim 2, wherein a width of the first side of each of the L-shaped annular grooves is L1, a width of the second side of each of the L-shaped annular grooves is L2, and the following condition is satisfied:

$0.45<L1/L2<2.5.$

8. The lens module of claim 2, wherein the degree of inclination between the second side and the central axis is α, and the following condition is satisfied:

0 degree $≤α≤15$ degrees.

9. The lens module of claim 2, wherein the stripe and wedge-shaped structure comprises a tapered portion.

10. The lens module of claim 9, wherein the tapered portion comprises a smooth surface.

11. The lens module of claim 2, wherein the stripe-shaped structures have even height, a height of each of the stripe-shaped structures is h, and the following condition is satisfied:

$0.015$ mm$<h<0.23$ mm.

12. The lens module of claim 2, wherein a cross section of the inner surface is zigzag form.

13. The lens module of claim 1, wherein the bottom diameter of the object-side L-shaped annular groove is φ1, the bottom diameter of the image-side L-shaped annular groove is φ2, a diameter of the outer surface is φo, a diameter of the inner surface is φi, and the following condition is satisfied:

$0.05<(φ2-φ1)/(φo-φi)<0.55.$

14. The lens module of claim 1, wherein the annular light trapping component further comprises an axial assembling structure, the annular light trapping component is disposed in the optical lens assembly by the axial assembling structure, the optical lens assembly comprises a lens element adjacent to the annular light trapping component, and the axial assembling structure is configured to align the central axis of the annular light trapping component with a center of the lens element.

15. The lens module of claim 1, wherein the annular light trapping component is a fixing ring configured to determine axial distances between every two of lens elements of the optical lens assembly that are adjacent to each other, the central aperture of the annular light trapping component is configured to allow light to pass through the lens module, and only one of the object-side surface and the image-side surface contacts the optical lens assembly.

16. An electronic device, comprising:
the lens module of claim 1.

17. A lens module, comprising:
a barrel;
an optical lens assembly, disposed in the barrel; and
an annular light trapping component, disposed in the barrel, the barrel and the annular light trapping component being independent pieces, and the annular light trapping component comprising:
  an inner surface surrounding a central axis of the annular light trapping component, and the inner surface defining a central aperture;
  an outer surface opposite to the inner surface;
  an object-side surface facing toward an object side of the annular light trapping component, the object-side surface being connected to the inner surface and the outer surface;
  an image-side surface facing toward an image side of the annular light trapping component, the image-side surface being connected to the inner surface and the outer surface, and the image-side surface being opposite to the object-side surface;
  wherein the inner surface comprises at least one L-shaped annular groove, the annular light trapping component comprises a plurality of stripe and wedge-shaped structures disposed in the at least one L-shaped annular groove, the stripe and wedge-shaped structures are arranged along a circumferential direction of the annular light trapping component, a light trapping structure is formed between every pair of the stripe and wedge-shaped structures, and each of the stripe and wedge-shaped structures comprises a tapered portion;
  wherein the at least one L-shaped annular groove comprises a first side and a second side connected to each other, the first side and the second side are located between the object-side surface and the image-side surface, the stripe and wedge-shaped structures are disposed on the second side, an end of the stripe and wedge-shaped structures is facing and connected to the first side, and a degree of inclination between the first side and the central axis is larger than a degree of inclination between the second side and the central axis;
  wherein each of the stripe and wedge-shaped structures has a wedge-shaped cross section, and each of the stripe and wedge-shaped structures extends from the object side to the image side;
  wherein the degree of inclination between the second side and the central axis is α, and the following condition is satisfied:

0 degree ≤α≤15 degrees;

wherein a thickness of the annular light trapping component is t, a length of each of the stripe and wedge-shaped structures is d, and the following condition is satisfied:

$0.05<d/t<0.50$.

18. The lens module of claim 17, wherein an angle between the first side and the second side of the at least one L-shaped annular groove is θ, and the following condition is satisfied:

46 degrees <θ<136 degrees.

19. The lens module of claim 17, wherein a width of the first side of the at least one L-shaped annular groove is L1, a width of the second side of the at least one L-shaped annular groove is L2, and the following condition is satisfied:

$0.45<L1/L2<2.0$.

20. The lens module of claim 17, wherein the degree of inclination between the second side and the central axis is α, and the following condition is satisfied:

0 degree ≤α≤8.0 degrees.

21. The lens module of claim 17, wherein a bottom diameter of the at least one L-shaped annular groove is φg, a diameter of the outer surface is φo, a diameter of the inner surface is φi, and the following condition is satisfied:

$0.5<(\varphi o-\varphi g)/(\varphi g-\varphi i)<10$.

22. The lens module of claim 17, wherein the stripe and wedge-shaped structures have even height, and the tapered portion of each of the stripe and wedge-shaped structures comprises a smooth surface.

23. The lens module of claim 17, wherein the annular light trapping component further comprises an axial assembling structure, the annular light trapping component is disposed in the optical lens assembly by the axial assembling structure, the optical lens assembly comprises a lens element adjacent to the annular light trapping component, and the axial assembling structure is configured to align the central axis of the annular light trapping component with a center of the lens element.

24. The lens module of claim 17, wherein the annular light trapping component is a fixing ring configured to determine axial distances between every two of lens elements of the optical lens assembly that are adjacent to each other, the central aperture of the annular light trapping component is configured to allow light to pass through the lens module, and only one of the object-side surface and the image-side surface contacts the optical lens assembly.

* * * * *